United States Patent
Gobara

(10) Patent No.: US 10,469,896 B2
(45) Date of Patent: Nov. 5, 2019

(54) CONTENT RECEPTION DEVICE, CONTENT RECEPTION SYSTEM, CONTENT RECEPTION DEVICE CONTROL METHOD, AND PROGRAM

(71) Applicant: Panasonic Intellectual Property Management Co., Ltd., Osaka (JP)

(72) Inventor: Kunio Gobara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 3 days.

(21) Appl. No.: 15/503,799

(22) PCT Filed: Oct. 1, 2015

(86) PCT No.: PCT/JP2015/004995
§ 371 (c)(1),
(2) Date: Feb. 14, 2017

(87) PCT Pub. No.: WO2016/051803
PCT Pub. Date: Apr. 7, 2016

(65) Prior Publication Data
US 2017/0280186 A1     Sep. 28, 2017

(30) Foreign Application Priority Data

Oct. 3, 2014   (JP) ................... 2014-205251
Feb. 18, 2015  (JP) ................... 2015-030057

(51) Int. Cl.
*G06F 3/00*    (2006.01)
*G06F 13/00*   (2006.01)
(Continued)

(52) U.S. Cl.
CPC ......... *H04N 21/431* (2013.01); *H04N 21/436* (2013.01); *H04N 21/482* (2013.01)

(58) Field of Classification Search
None
See application file for complete search history.

(56) References Cited

U.S. PATENT DOCUMENTS 6,147,714 A     11/2000  Terasawa et al.
9,003,445 B1 *  4/2015   Rowe .................... H04N 19/20
                                                725/37
(Continued)

FOREIGN PATENT DOCUMENTS

JP    2000-116606     4/2000
JP    2005-066126 A   3/2005
(Continued)

OTHER PUBLICATIONS

International Search Report of PCT application No. PCT/JP2015/004995 dated Dec. 22, 2015.
(Continued)

*Primary Examiner* — William J Kim
(74) *Attorney, Agent, or Firm* — McDermott Will & Emery LLP

(57) ABSTRACT

A content receiving device includes: a content receiver that acquires a content item; a generator that generates a thumbnail of the content item, which is acquired by the content receiver; a thumbnail storage that stores the thumbnail generated by the generator; a request receiver that receives the acquisition request for the thumbnail; and a transmitter. The transmitter transmits the thumbnail stored in the thumbnail storage, to a transmission source of the acquisition request for the thumbnail, in response to the acquisition request for the thumbnail being received by the request receiver.

6 Claims, 21 Drawing Sheets

(51) Int. Cl.
    *H04N 5/445*     (2011.01)
    *H04N 21/431*     (2011.01)
    *H04N 21/436*     (2011.01)
    *H04N 21/482*     (2011.01)

(56) References Cited

U.S. PATENT DOCUMENTS

| | | |
|---|---|---|
| 9,756,377 B2 | 9/2017 | Augenbraun et al. |
| 2002/0046232 A1 | 4/2002 | Adams et al. |
| 2002/0166122 A1 | 11/2002 | Kikinis et al. |
| 2006/0039481 A1 | 2/2006 | Shen et al. |
| 2006/0051055 A1 | 3/2006 | Ohkawa |
| 2006/0248553 A1 | 11/2006 | Mikkelson et al. |
| 2007/0192791 A1* | 8/2007 | Sullivan ............ H04N 5/50 725/38 |
| 2007/0198951 A1* | 8/2007 | Frank ............ G06F 17/30017 715/838 |
| 2007/0204297 A1 | 8/2007 | Gonzalez |
| 2008/0060032 A1 | 3/2008 | Toutenhoofd |
| 2008/0083002 A1* | 4/2008 | Yamaguchi ......... G11B 27/105 725/61 |
| 2008/0298697 A1* | 12/2008 | Lee ................ G06F 3/04817 382/243 |
| 2009/0162035 A1 | 6/2009 | Narahara et al. |
| 2010/0050124 A1* | 2/2010 | Douillet ............ H04L 12/2812 715/838 |
| 2010/0185987 A1* | 7/2010 | Yang ............ G06F 17/30274 715/838 |
| 2010/0306798 A1* | 12/2010 | Ahn ................ H04N 5/445 725/38 |
| 2010/0333159 A1 | 12/2010 | Tseng |
| 2011/0023068 A1 | 1/2011 | Zeldis et al. |
| 2011/0061075 A1* | 3/2011 | Lee ............ H04N 5/44591 725/46 |
| 2011/0090402 A1 | 4/2011 | Huntington et al. |
| 2011/0321095 A1* | 12/2011 | Yao ............ H04N 21/235 725/41 |
| 2012/0020643 A1* | 1/2012 | Kato ............ G11B 27/034 386/241 |
| 2012/0117057 A1 | 5/2012 | Adimatyam et al. |
| 2012/0117599 A1* | 5/2012 | Jin ............ H04N 21/41407 725/41 |
| 2013/0179921 A1 | 7/2013 | Ma et al. |
| 2014/0245357 A1 | 8/2014 | Huntington et al. |
| 2015/0082457 A1* | 3/2015 | Nakamura ............ H04L 63/10 726/27 |
| 2016/0307596 A1* | 10/2016 | Hardin ............ H04L 65/40 |
| 2017/0155773 A1* | 6/2017 | Sato ............ H04N 1/0023 |

FOREIGN PATENT DOCUMENTS

| | | |
|---|---|---|
| JP | 2006-253960 | 9/2006 |
| JP | 2009-152927 | 7/2009 |
| JP | 2010-187246 A | 8/2010 |
| JP | 2012-231538 | 11/2012 |
| JP | 2013-008216 A | 1/2013 |

OTHER PUBLICATIONS

STUN—Simple Traversal of User Datagram Protocol (UDP) Through Network Address Translators (NATs), RFC 3489, Mar. 2003.
The Extended European Search Report dated Jun. 1, 2017 for the related European Patent Application No. 15845941.2.
The Extended European Search Report dated Jun. 1, 2017 for the related European Patent Application No. 15846586.4.
The Extended European Search Report dated Jun. 1, 2017 for the related European Patent Application No. 15847087.2.
International Search Report of PCT Application No. PCT/JP2015/004996 dated Dec. 22, 2015.
Non-Final Office Action dated Nov. 29, 2017, issued in U.S. Appl. No. 15/503,819.
International Search Report of PCT Application No. PCT/JP2015/004994 dated Dec. 22, 2015.
Non-Final Office Action dated Jan. 23, 2018, issued in U.S. Appl. No. 15/503,792.
Non-Final Office Action issued in related U.S. Appl. No. 15/503,792 dated Oct. 29, 2018.

* cited by examiner

FIG. 17

| Generation date/time | Channel number | File path |
|---|---|---|
| 20141210123015 | 8 | /img/8/thumb.png |
| 20141210123020 | 6 | /img/6/thumb.png |
| 20141210123025 | 4 | /img/4/thumb.png |

CONTENT RECEPTION DEVICE, CONTENT RECEPTION SYSTEM, CONTENT RECEPTION DEVICE CONTROL METHOD, AND PROGRAM

TECHNICAL FIELD

The present disclosure relates to a content receiving device, a content receiving system, and a control method of the content receiving device.

BACKGROUND ART

PTL 1 discloses a technique regarding a content receiving device that receives or acquires a video content item (hereinafter, simply referred to as a "content item") from a broadcast wave, a storage medium or the like.

NPL 1 discloses a technique for making communication beyond NAT (Network Address Translation).

It is desired that, when a user browses the acquired content item, the content receiving device display information such as characters indicating a title and the like of the content item so that the user can easily understand the information.

In the content receiving device, thumbnails are sometimes used when a plurality of the content items are displayed as a list. Each of the thumbnails is a reduced display of a still image or a moving image, which indicates details of the content item.

In a case of acquiring such content items from the broadcast wave, the content receiving device may present a list of acquired content items to a user.

CITATION LIST

Patent Literatures

PTL 1: Unexamined Japanese Patent Publication No. 2009-152927 Non-Patent Literatures
NPL 1: STUN—Simple Traversal of User Datagram Protocol (UDP) Through Network Address Translators (NATs), RFC 3489, March 2003

SUMMARY

The present disclosure provides a content receiving device capable of enhancing convenience for a user in a case of presenting, to the user, a list of content items acquired from broadcast waves or the like.

The content receiving device in the present disclosure includes: a content receiver that acquires a content item; a generator that generates a thumbnail of the content item, which is acquired by the content receiver; a thumbnail storage that stores the thumbnail generated by the generator; a request receiver that receives an acquisition request for a thumbnail; and a transmitter. The transmitter transmits the thumbnail stored in the thumbnail storage, to a transmission source of the acquisition request for the thumbnail, in response to the acquisition request for the thumbnail being received by the request receiver.

A content receiving system in the present disclosure includes: a content receiving device; and a display device. The content receiving device includes: a content receiver that acquires a content item; a generator that generates a thumbnail of the content item, which is acquired by the content receiver; a thumbnail storage that stores the thumbnail generated by the generator; a request receiver that receives an acquisition request for a thumbnail being transmitted from the display device; and a transmitter that transmits the thumbnail stored in the thumbnail storage, to a transmission source of the acquisition request for the thumbnail, in response to the acquisition request for the thumbnail being received by the request receiver. The display device includes: a thumbnail request transmitter that transmits the acquisition request for the thumbnail to the content receiving device; a thumbnail receiver that receives the thumbnail transmitted from the content receiving device; and a display that displays the thumbnail received by the thumbnail receiver.

The content receiving device in the present disclosure is effective for enhancing the convenience for the user in the case of presenting, to the user, the list of content items acquired from the broadcast waves or the like.

BRIEF DESCRIPTION OF DRAWINGS

FIG. 17 is a diagram schematically showing an example of attached information retained in a thumbnail storage of the content receiving device in the fourth exemplary embodiment.

DESCRIPTION OF EMBODIMENTS

Figure 1:
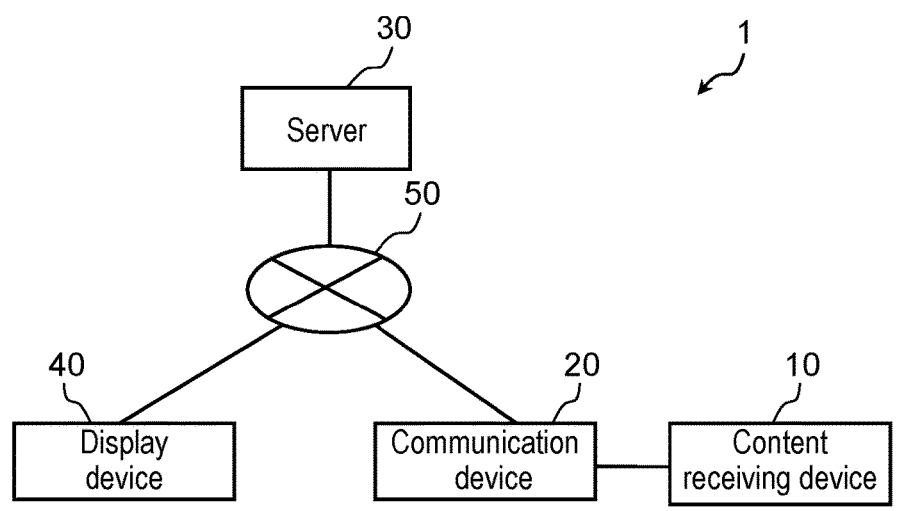
FIG. 1 is a diagram schematically showing an example of a system configuration of a content receiving system in a first exemplary embodiment.

Hereinafter, exemplary embodiments will be described in detail with reference to the drawings as appropriate. However, a description more in detail than necessary is omitted in some case. For example, a detailed description of a well-known item and a duplicate description of substantially the same configuration are omitted in some case. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims.

Moreover, the respective drawings are schematic diagrams, and are not necessarily exactly illustrated. Furthermore, in the respective drawings, the same reference numerals are assigned to the same constituent elements.

Note that, in the following description, a content item refers to a video content item including a plurality of image frames. The content item may include audio, or does not have to include the audio.

First Exemplary Embodiment

In a first exemplary embodiment, a description is made of a content receiving system effective for suppressing an increase in storage capacity of a storage device included in a server, and for suppressing an increase in channel capacity of a communication line to which the server is connected.

A description is made below of the first exemplary embodiment with reference to FIG. 1 to FIG. 11.

[1-1. Configuration]

FIG. 1 is a diagram schematically showing an example of a system configuration of content receiving system 1 in the first exemplary embodiment.

As shown in FIG. 1, content receiving system 1 includes: content receiving device 10; communication device 20; server 30; and display device 40. Content receiving device 10 is connected to network 50 through communication device 20, and server 30 and display device 40 are connected to network 50.

Communication device 20 is a communication device for connecting a home LAN (Local Area Network) and a global network to each other. Content receiving device 10 is an example of a terminal connected to the home LAN, and network 50 is an example of the global network. Communication device 20 has a NAT (Network Address Translation) function that is an address translation function for communicably connecting, the terminal connected to the home LAN and a terminal connected to the global network, with each other.

In general, in the home LAN, a private IP (Internet Protocol) address (hereinafter, also simply referred to as a "private address") is used, and in the global network, a global IP address (hereinafter, also simply referred to as a "global address") is used. A device which has the private address (for example, content receiving device 10), and a device which has the global address (for example, server 30 or display device 40), have addressing-architectures different from each other, and accordingly, cannot directly communicate with each other by using the addresses held by the respective devices. Accordingly, communication device 20 translates the private address and the global address into each other, whereby a device connected to the home LAN and the device having the global address become communicable with each other.

Note that, in the case of performing such address translation as described above, communication device 20 does not change contents included in a payload portion of a communication packet.

For example, communication device 20 is a router (so-called broadband router) installed in a user's home, and is disposed on a boundary between the home LAN and the global network (or an access network for connecting to the global network).

Content receiving device 10 is a receiving device that receives content items from a broadcast wave or other content transmission sources. Content receiving device 10 transmits list information indicating a list of the content items held by content receiving device 10, and thumbnails of the held content items through network 50 to display device 40. Then, in response to a request (content acquisition request) from display device 40, content receiving device 10 transmits the held content items to display device 40. Content receiving device 10 communicates with respective devices, which are connected to network 50, by using the NAT function of communication device 20. For example, content receiving device 10 is a recording device, a television receiver or the like, which is installed in the user's home.

Note that, for example, the other content transmission sources include a content distribution site on the Internet. Specifically, content receiving device 10 may acquire content items from the content distribution site.

Server 30 is a server device for relaying information exchanged between content receiving device 10 and display device 40. Server 30 retains the list of the received content items held by content receiving device 10. Note that server 30 may include a relay (not shown) that relays information. Server 30 is substantially the same as a server computer that is used generally, and accordingly, a detailed description thereof is omitted. Note that, for server 30, a general computer having a network connection function may be used.

Display device 40 is a display terminal that displays the list of a plurality of the content items, which are held by content receiving device 10, and the thumbnails of these content items, and is thereby capable of presenting the list of the content items held by content receiving device 10. For example, display device 40 is a communication terminal such as a high-performance cellular phone terminal (smart phone), a cellular phone terminal, and a PC (Personal Computer).

Network 50 is a communication line to which communication device 20 (content receiving device 10 connected to communication device 20), server 30 and display device 40 are individually connected. A communication standard of network 50 may be arbitrary, and for example, may be configured by including a cellular phone communication network, a public communication network, a local area communication network, a home communication network, and the like, or may be configured in such a manner that a plurality of the above-described communication networks are combined with one another.

First, a description is made of content receiving device 10.

Figure 2:
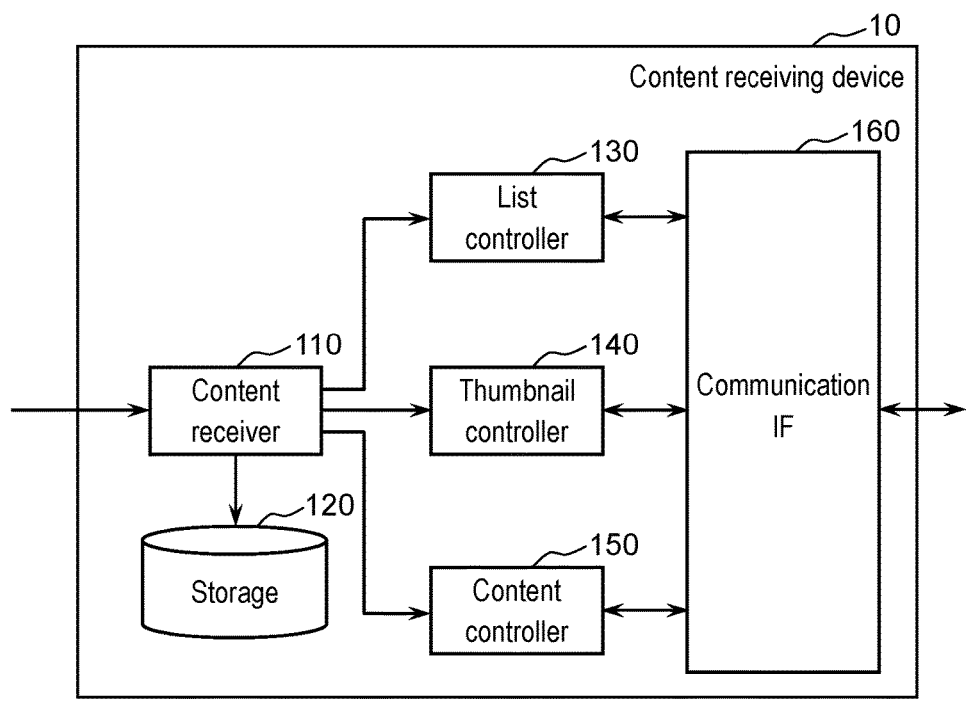
FIG. 2 is a block diagram schematically showing an example of a configuration of a content receiving device in the first exemplary embodiment.

FIG. 2 is a block diagram schematically showing an example of a configuration of content receiving device 10 in the first exemplary embodiment.

Figure 3:
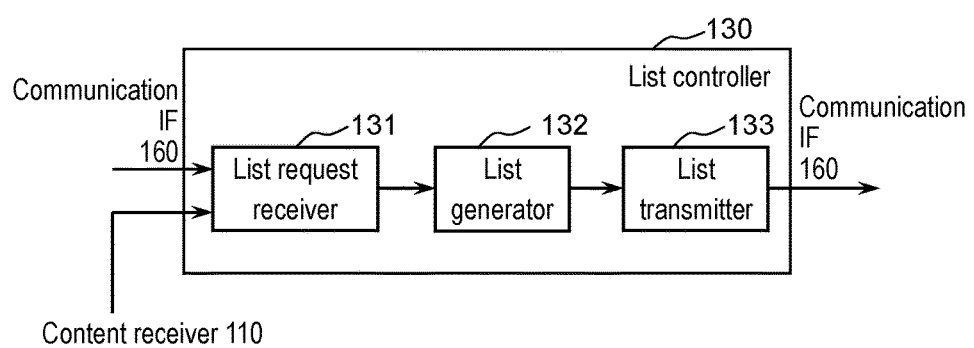
FIG. 3 is a block diagram schematically showing an example of a configuration of a list controller of the content receiving device in the first exemplary embodiment.

FIG. 3 is a block diagram schematically showing an example of a configuration of list controller 130 of content receiving device 10 in the first exemplary embodiment.

Figure 4:
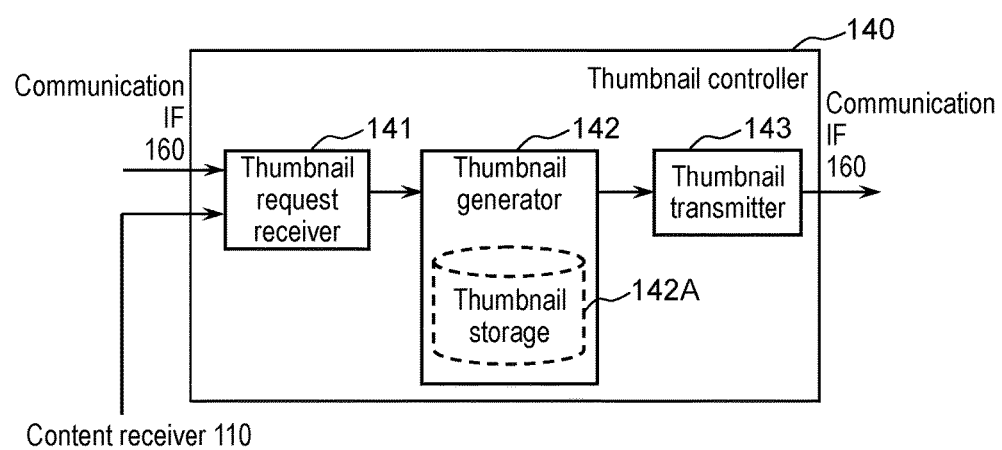
FIG. 4 is a block diagram schematically showing an example of a configuration of a thumbnail controller of the content receiving device in the first exemplary embodiment.

FIG. 4 is a block diagram schematically showing an example of a configuration of thumbnail controller 140 of content receiving device 10 in the first exemplary embodiment.

Figure 5:
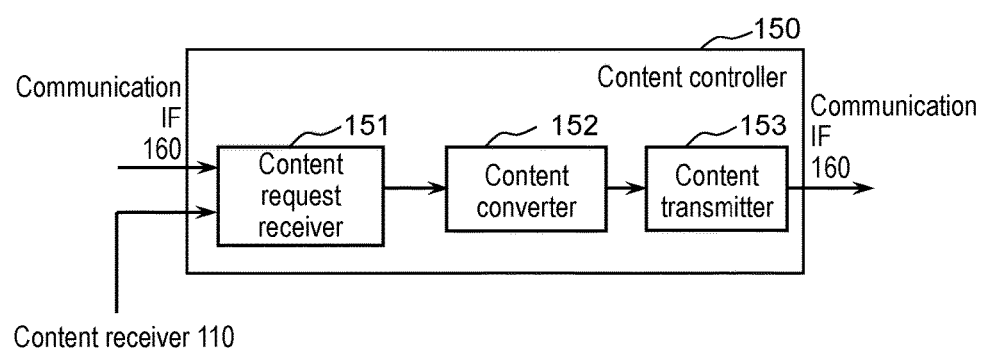
FIG. 5 is a block diagram schematically showing an example of a configuration of a content controller of the content receiving device in the first exemplary embodiment.

FIG. 5 is a block diagram schematically showing an example of a configuration of content controller 150 of content receiving device 10 in the first exemplary embodiment.

As shown in FIG. 2, content receiving device 10 includes: content receiver 110; storage 120; list controller 130; thumbnail controller 140; content controller 150; and communication IF (Interface) 160.

Content receiver 110 is configured to be capable of receiving (or also referred to as "acquiring") content items from a broadcast wave broadcast by a broadcast station, or from other content transmission sources. Such a content transmission source may be arbitrary as long as the content transmission source has a function to present the content items. For example, the content transmission source may be a broadcast station that broadcasts the content items by a broadcast wave, or content receiver 110 may be configured to receive the broadcast wave by using a tuner (not shown), and to acquire the content items included in the received broadcast wave.

Moreover, content receiver 110 may be configured to acquire the content items from a recording medium in which the content items are stored. The content items stored in the recording medium may be content items acquired (recorded) by content receiver 110 from the broadcast wave or the like in the past, or may be content items acquired by other devices.

Moreover, for example, content receiver 110 may be configured to acquire the content items through the Internet from a content distribution site on the Internet.

Note that content receiver 110 is an example of a first receiver.

Storage 120 is a storage device that stores the content items. For example, storage 120 is a large capacity storage device such as an HDD (Hard Disk Drive); however, storage 120 may be a video recording (audio recording) device capable of detachably attaching thereto a semiconductor storage element or a recording medium such as an optical disc and a magnetic disc, and the like. Storage 120 stores the content items as electronic data encoded in an appropriate format. The content items acquired in content receiver 110 are stored in storage 120. The content items stored in storage 120 may be content items acquired (recorded) by content receiver 110 from the broadcast wave or the like in the past, or may be content items acquired by other devices.

Note that content receiving device 10 may include a connector (not shown) for connecting the storage medium thereto in place of storage 120. In that case, the storage medium, which is connected to the connector and stores the content items, may be used as storage 120.

List controller 130 transmits a list of the content items, which is acquired by content receiver 110, to display device 40 through communication IF 160. A description is made below of list controller 130 with reference to FIG. 3.

List controller 130 includes: list request receiver 131; list generator 132; and list transmitter 133.

List request receiver 131 receives an acquisition request for the list of the content items through communication IF 160. This acquisition request is a request transmitted from list request transmitter 411 (refer to FIG. 6, FIG. 7) of display device 40 to content receiving device 10 in order that display device 40 can acquire the list of the content items held by content receiving device 10.

List generator 132 generates a list including pieces of identification information (hereinafter, also referred to as "content IDs"), which identify the respective content items acquired by content receiver 110. The content IDs may be arbitrary as long as being information capable of uniquely identifying the content items. For example, each of the content IDs may be information including a broadcast station name, a recording starting date/time, and a recording ending date/time. In place of the broadcast station name, a channel number of a channel that is a frequency band in the broadcast wave, the channel number being associated with the broadcast station, may be used. Alternatively, there may be used information including a network ID, a TS (transport stream) ID and a service ID in digital broadcast. Moreover, the content ID may include an event ID. Moreover, the content ID may include an identifier which is uniquely generated and given to the content item in order that content receiving device 10 (content receiver 110) can identify the content item at the time of recording the content item.

When list request receiver 131 receives the acquisition request for the list of content items from display device 40, list generator 132 may generate the above-described list corresponding to the acquisition request. Alternatively, list generator 132 may generate the above-described list at other timing. For example, list generator 132 may generate the above-described list when content receiver 110 acquires a new content item. In that case, list generator 132 may generate a list (hereinafter, also referred to as a "difference list") including only the content item newly acquired by content receiver 110. Moreover, list generator 132 may generate the list at other arbitrary timing.

List transmitter 133 transmits the list of the content items being generated by list generator 132, to display device 40 through communication IF 160. At this time, list transmitter 133 transmits the list to server 30 so that the list can reach display device 40 from server 30 by using a relay function by server 30.

In a case where list generator 132 generates the difference list, list transmitter 133 transmits the generated difference list to display device 40 through server 30. In this case, display device 40, which has received the difference list, updates the already held list by adding the difference list to this held list, and can thereby obtain a latest list.

Thumbnail controller 140 transmits the respective thumbnails of the content items, which are acquired by content receiver 110, to display device 40 through communication IF 160. A description is made below of thumbnail controller 140 with reference to FIG. 4.

Thumbnail controller 140 includes: thumbnail request receiver 141; thumbnail generator 142; and thumbnail transmitter 143.

Thumbnail request receiver 141 receives an acquisition request for the thumbnail being transmitted from thumbnail request transmitter 421 (refer to FIG. 6 and FIG. 8) of display device 40, through communication IF 160. The thumbnail refers to a still image or a moving image, which corresponds to each of the content items and displays the details of the content items in a reduced display. One thumbnail is stored in one electronic file. A format of the electronic file may be a still image format (jpg, bmp or the like) or a moving image format (mpg, avi or the like). An electronic file with such a moving image format can store a thumbnail with a larger amount of information.

Note that the acquisition request for a thumbnail may include a user designation as to whether the acquisition request is a request for the still image thumbnail or a request for the moving image thumbnail.

Note that the acquisition request for the thumbnail may include identification information for identifying the content item, the broadcast station or the like. In this case, thumbnail request receiver 141 may notify content receiver 110 of the identification information, and the thumbnail of the content item identified by the identification information may be generated in thumbnail generator 142.

Thumbnail generator 142 generates the thumbnail of the content item acquired by content receiver 110. In a case where the user designation of the moving image or the still image is included in the acquisition request for the thumbnail, thumbnail generator 142 generates the moving image thumbnail or the still image thumbnail based on the user designation.

Note that, in a case where the identification information is included in the acquisition request for the thumbnail, thumbnail generator 142 may generate the thumbnail of the content item identified by the identification information.

Note that, for example, thumbnail generator 142 may extract a part of a plurality of image frames included in the content item, and may generate the thumbnail in a moving image file format by using the extracted image frame.

Note that thumbnail generator 142 may generate the thumbnail when thumbnail request receiver 141 receives the acquisition request for the thumbnail, or may generate the thumbnail at other timing. For example, when content receiver 110 receives a new content item, thumbnail generator 142 may generate a thumbnail of this newly acquired content item.

Note that, in a case of receiving a notification on timing of generating the thumbnail from content receiver 110, thumbnail generator 142 may generate the thumbnail at the timing that is based on the notification.

Note that thumbnail generator 142 may include thumbnail storage 142A that stores the thumbnail generated by thumbnail generator 142. Moreover, a part of storage 120 may be used as thumbnail storage 142A. In a case where thumbnail generator 142 includes thumbnail storage 142A, thumbnail generator 142 may determine whether or not the thumbnail to be generated is already stored in thumbnail storage 142A in a case of generating the thumbnail, and may generate the thumbnail only in a case where it is determined that the thumbnail is not stored therein. Then, in a case where the thumbnail to be generated is stored in thumbnail storage 142A, thumbnail generator 142 may read out and use the stored thumbnail.

Note that the thumbnail generator 142 may generate a thumbnail conforming to a standard for copy protection of the content item. The standard includes, for example, DTCP (Digital Transmission Content Protection) and DTCP+.

Thumbnail transmitter 143 transmits the thumbnail generated by thumbnail generator 142, to display device 40 through communication IF 160.

Content controller 150 transmits the content item, which is acquired by content receiver 110, to display device 40 through communication IF 160. A description is made below of content controller 150 with reference to FIG. 5.

Content controller 150 includes: content request receiver 151; content converter 152; and content transmitter 153.

Content request receiver 151 receives the acquisition request for the content item from content request transmitter 431 (refer to FIG. 6 and FIG. 9) of display device 40 through communication IF 160. The acquisition request for the content item includes a content ID that identifies a content item as a target of the acquisition request. Moreover, the acquisition request for the content item may further include image quality information. The image quality information refers to information indicating quality of an image displayable by display device 40, and may be expressed by a numeric value (for example, "1", "2" or the like), or by a character string (for example, "high quality", "low quality" or the like), or by a data rate (for example, "1.5 Mbps", "400 kbps" or the like), or the like.

Content converter 152 encodes the content item, which is acquired by content receiver 110, in response to the acquisition request for the content item being received by content request receiver 151. In a case where the image quality information is included in the acquisition request for the content item, content converter 152 encodes the content item so that the content item can conform to the image quality information.

Content transmitter 153 transmits the content item, which is encoded by content converter 152, to display device 40 through communication IF 160.

Communication IF 160 is a communication interface for making communication with network 50 through communication device 20. Moreover, communication IF 160 can establish a connection (hereinafter, also referred to as a "P2P connection") for making P2P (Peer to Peer) communication with communication IF 460 (refer to FIG. 6) of display device 40, and can make P2P communication with display device 40. That is, communication IF 160 can make the communication between display device 40 and each of list controller 130, thumbnail controller 140 and content controller 150, by the P2P communication. Note that unlike server-client-type communication, the P2P communication refers to communication which terminals make directly with each other without passing through a server or the like. The P2P communication is communication made with a communication partner present beyond communication device 20 (NAT), and accordingly, may be referred to as NAT traversal communication.

Note that communication IF 160 may make the communication between display device 40 and each of thumbnail controller 140 and content controller 150, by communication that passes through server 30. Note that, the communication that passes through server 30 is generally referred to as server relay communication.

Communication IF 160 is a communication interface of a type suitable for the communication with network 50. The communication interface of such a type includes, for example, a wired LAN conforming to IEEE 802.3, a wireless LAN conforming to IEEE 802.11, and the like.

Next, a description is made of display device 40.

Figure 6:
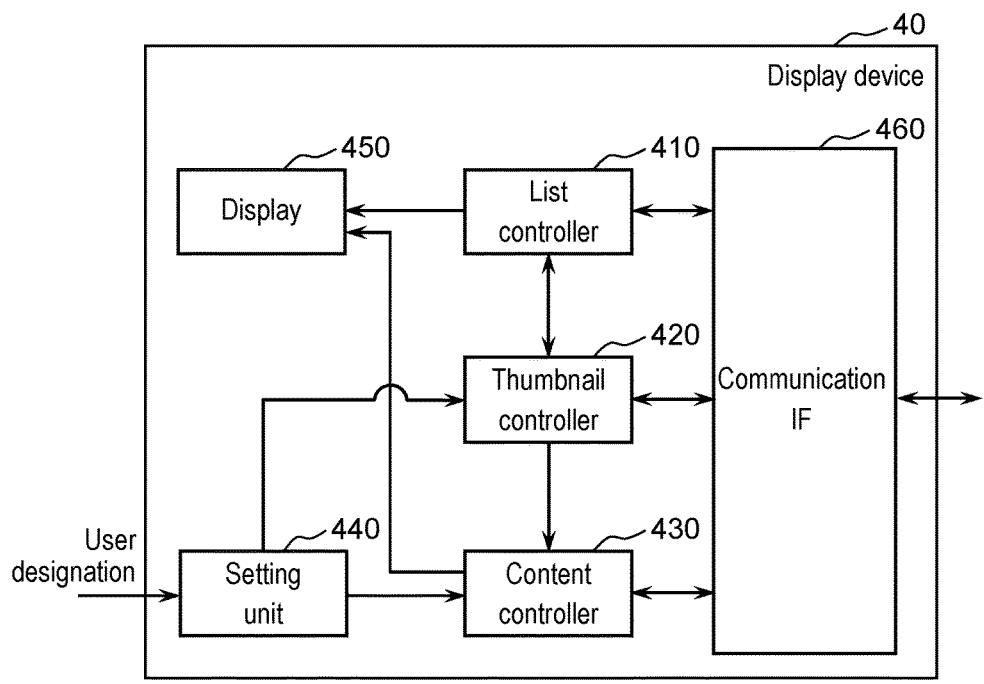
FIG. 6 is a block diagram schematically showing an example of a configuration of a display device in the first exemplary embodiment.

FIG. 6 is a block diagram schematically showing an example of a configuration of display device 40 in the first exemplary embodiment.

Figure 7:
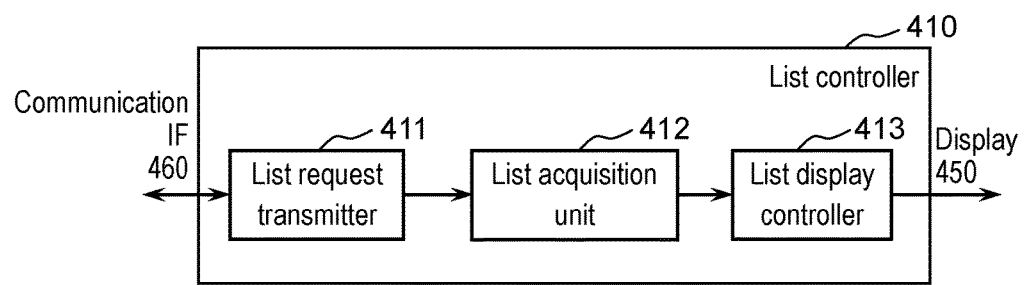
FIG. 7 is a block diagram schematically showing an example of a configuration of a list controller of the display device in the first exemplary embodiment.

FIG. 7 is a block diagram schematically showing an example of a configuration of list controller 410 of display device 40 in the first exemplary embodiment.

Figure 8:
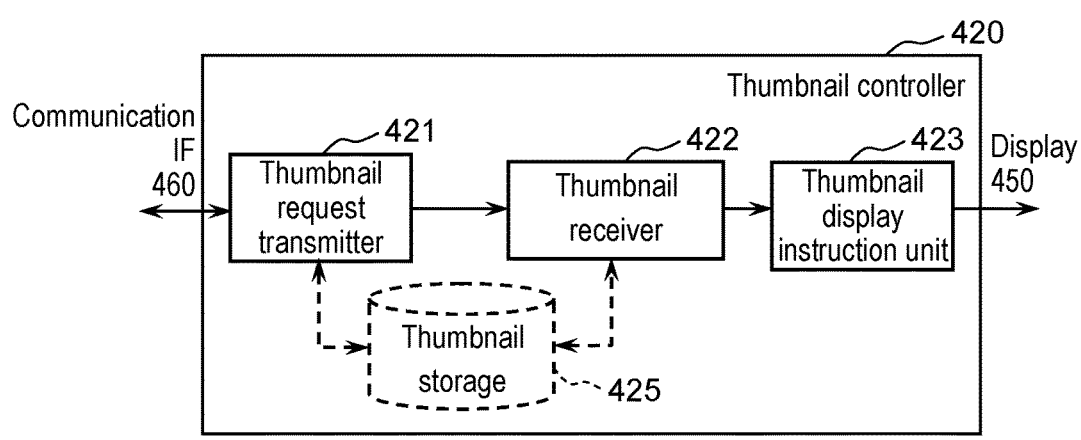
FIG. 8 is a block diagram schematically showing an example of a configuration of a thumbnail controller of the display device in the first exemplary embodiment.

FIG. 8 is a block diagram schematically showing an example of a configuration of thumbnail controller 420 of display device 40 in the first exemplary embodiment.

Figure 9:
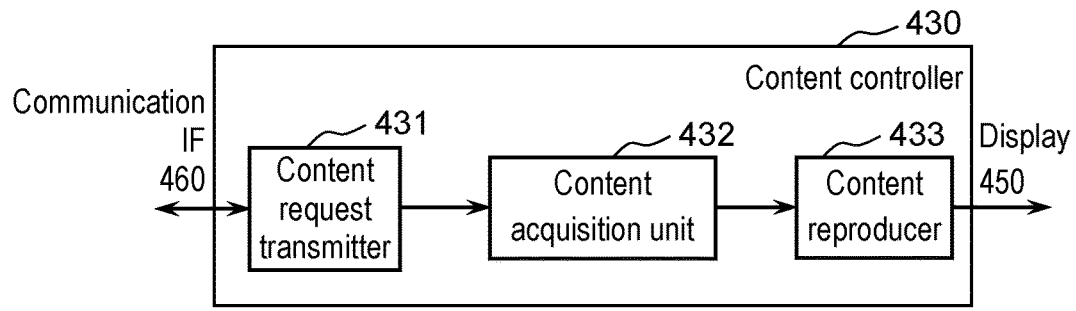
FIG. 9 is a block diagram schematically showing an example of a configuration of a content controller of the display device in the first exemplary embodiment.

FIG. 9 is a block diagram schematically showing an example of a configuration of content controller 430 of display device 40 in the first exemplary embodiment.

As shown in FIG. 6, display device 40 includes: list controller 410; thumbnail controller 420; content controller 430; setting unit 440; display 450; and communication IF 460.

List controller 410 acquires the list of the content items, which are held by content receiving device 10, from content receiving device 10 or server 30, and controls display 450 so that the acquired list can be displayed in an appropriate expression format on display 450. A description is made below of list controller 410 with reference to FIG. 7.

List controller 410 includes: list request transmitter 411; list acquisition unit 412; and list display controller 413.

List request transmitter 411 transmits an acquisition request for requesting the list of the content items held by content receiving device 10. The acquisition request may be transmitted from list request transmitter 411 to server 30, or may be transmitted from list request transmitter 411 to list request receiver 131 (refer to FIG. 3) of content receiving device 10. In a case where the acquisition request for the list of the content items is transmitted from list request transmitter 411 to server 30, server 30 may transmit the list of the content items held by content receiving device 10, the list being held by server 30, to display device 40 in response to the acquisition request, or may transfer (transmit) the acquisition request to content receiving device 10. In a case where the acquisition request is transferred from server 30 to content receiving device 10, server 30 receives information, which is transmitted from content receiving device 10 in response to the acquisition request, and then transfers the received information to display device 40.

As described above, in the case where the acquisition request for the list of the content items is transmitted from list request transmitter 411 to server 30, display device 40 only needs to communicate with server 30, and does not have to communicate with content receiving device 10. Therefore, display device 40 can relatively shorten a time from the transmission of the acquisition request until the acquisition of the list of the content items, which corresponds to the acquisition request.

List acquisition unit 412 acquires the list of the content items held by content receiving device 10, the list being transmitted from content receiving device 10 or server 30 to display device 40, in response to the acquisition request for the list of the content items being transmitted from list request transmitter 411. List acquisition unit 412 is an example of a second receiver.

List display controller 413 controls display 450 so that an image showing the list of the content items held by content receiving device 10, the list being acquired by list acquisition unit 412, can be displayed on display 450 as appropriate.

Thumbnail controller 420 receives the thumbnails of the content items, which are held by content receiving device 10, from content receiving device 10 through communication IF 460, and controls list controller 410 so that the received thumbnails can be displayed on display 450 as appropriate. A description is made below of thumbnail controller 420 with reference to FIG. 8.

Thumbnail controller 420 includes: thumbnail request transmitter 421; thumbnail receiver 422; and thumbnail display instruction unit 423.

Thumbnail request transmitter 421 makes a request for the thumbnails of the content items, which are held by content receiving device 10, to content receiving device 10. That is, in order to acquire each of the thumbnails of the content items corresponding to the content IDs included in the list acquired by list controller 410, thumbnail request transmitter 421 transmits the acquisition request for the thumbnail to thumbnail request receiver 141 (refer to FIG. 4) of content receiving device 10 through communication IF 460.

Note that the timing when thumbnail request transmitter 421 transmits the acquisition request for the thumbnail may be arbitrary. For example, after list display controller 413 displays the image showing the list of the content items on display 450, thumbnail request transmitter 421 may transmit the acquisition request for the thumbnail. Moreover, in order to inform thumbnail request transmitter 421 of this transmission timing from list display controller 413, for example, list display controller 413 may transmit a control signal for requesting thumbnail request transmitter 421 to acquire the thumbnail to thumbnail request transmitter 421. In this case, after receiving the control signal, thumbnail request transmitter 421 transmits the acquisition request for the thumbnail to content receiving device 10.

Note that thumbnail request transmitter 421 may determine whether or not the thumbnail as a target of the acquisition request is presented from a source (for example, a broadcast station or the like) of the content item corresponding to the thumbnail. Then, in a case of determining that the thumbnail is presented from the source of the content item, thumbnail request transmitter 421 may transmit the acquisition request for the thumbnail to the source of the content item, and may acquire the thumbnail from the source. Moreover, in a case of determining that the thumbnail is not presented from the source of the content item, thumbnail request transmitter 421 may transmit the acquisition request for the thumbnail to content receiving device 10.

Moreover, thumbnail request transmitter 421 may periodically update a currently-displayed thumbnail as the image showing the list of the content items on display 450. Specifically, with regard to the thumbnail currently displayed on display 450, thumbnail request transmitter 421 newly transmits the acquisition request for the thumbnail, and may thereby receive a new thumbnail, and may update the thumbnail, which is currently displayed on display 450, to the received thumbnail. Moreover, thumbnail request transmitter 421 may repeat the transmission of the acquisition request for a new thumbnail periodically (for example, every few seconds).

Note that, in a case of accepting the user designation that designates the moving image or the still image for the thumbnail, thumbnail request transmitter 421 may include this user designation in the acquisition request for the thumbnail.

Thumbnail receiver 422 receives the thumbnail transmitted from content receiving device 10 in response to the acquisition request for the thumbnail being transmitted from thumbnail request transmitter 421. Thumbnail receiver 422 is an example of a second receiver.

For list controller 410, thumbnail display instruction unit 423 performs control regarding the display of the thumbnail received by thumbnail receiver 422. Specifically, thumbnail display instruction unit 423 instructs list controller 410 to include the thumbnail, which is received by thumbnail receiver 422, in the image which list display controller 413 displays on display 450 by controlling display 450. An example of the image displayed on display 450 by this instruction is described later with reference to FIG. 11.

Note that, as shown by broken lines in FIG. 8, thumbnail controller 420 may include thumbnail storage 425. Thumbnail storage 425 is a storage device that temporarily retains the thumbnail received by thumbnail receiver 422. For example, thumbnail storage 425 is a semiconductor storage element; however, thumbnail storage 425 may be an HDD or the like. In a case where thumbnail controller 420 includes thumbnail storage 425, thumbnail receiver 422 can store the received thumbnail in thumbnail storage 425. In this way, before transmitting the acquisition request for the thumbnail, thumbnail request transmitter 421 can refer to the thumbnail retained in thumbnail storage 425, and can confirm whether or not the thumbnail as the target of the acquisition request is retained in thumbnail storage 425.

In a case where the thumbnail as the target of the acquisition request is retained in thumbnail storage 425, thumbnail request transmitter 421 does not transmit the acquisition request for the thumbnail, but may instruct thumbnail receiver 422 to acquire the thumbnail from thumbnail storage 425. Moreover, only in a case where the thumbnail as the target of the acquisition request is not retained in thumbnail storage 425, thumbnail request transmitter 421 may transmit the acquisition request for the thumbnail. Moreover, even if the thumbnail as the target of the acquisition request is retained in thumbnail storage 425, if the thumbnail is a thumbnail generated before a time designated in advance (that is, an old thumbnail), thumbnail request transmitter 421 may operate in a similar way to the case where the thumbnail as the target of the acquisition request is not retained in thumbnail storage 425 in order to acquire a new thumbnail.

Thumbnail controller 420 is configured as described above, whereby a frequency at which the thumbnail is transmitted and received decreases, and accordingly, traffic between display device 40 and content receiving device 10 can be reduced.

Content controller 430 receives each of the content items, which are held by content receiving device 10, from content receiving device 10 through communication IF 460, and controls display 450 so that the received content item can be displayed on display 450. A description is made below of content controller 430 with reference to FIG. 9.

Content controller 430 includes: content request transmitter 431; content acquisition unit 432; and content reproducer 433.

Content request transmitter 431 transmits the acquisition request for the content item, which is held by content receiving device 10, to content receiving device 10. Content request transmitter 431 accepts a user designation regarding the content item included in the list displayed on display 450 by list controller 410. Then, content request transmitter 431 transmits an acquisition request for the content item, which is designated by the user, to content request receiver 151 (refer to FIG. 5) of content receiving device 10 through communication IF 460. In this case, for example, after the control regarding the display of the thumbnail is performed for list controller 410 from thumbnail display instruction unit 423, a control signal for issuing a notification on timing of transmitting the acquisition request for the content item may be transmitted from thumbnail display instruction unit 423 to content request transmitter 431.

Note that content request transmitter 431 may transmit the acquisition request for the content item, the acquisition request including the above-mentioned image quality information.

Through communication IF 460, content acquisition unit 432 receives the content item transmitted from content receiving device 10 in response to the acquisition request for the content item being transmitted from content request transmitter 431.

Content reproducer 433 reproduces the content item received by content acquisition unit 432, and controls display 450 so that the reproduced still image or moving image can be displayed on display 450 as appropriate. The content item received by content acquisition unit 432 is encoded, and accordingly, content reproducer 433 decodes and reproduces the content item.

Setting unit 440 performs setting regarding operations for thumbnail controller 420 or content controller 430. Specifically, setting unit 440 performs setting, which includes the designation of the moving image or the still image for the thumbnail, for thumbnail controller 420. Moreover, setting unit 440 performs setting, which includes a designation of the content item and a designation of the image quality information, for content controller 430. For example, setting unit 440 accepts the user designation regarding these setting and designation, and sets information, which is based on the accepted user designation, on thumbnail controller 420 or content controller 430, and thereby reflects the accepted user designation to the operations of display device 40.

Display 450 is a display panel that displays an image. Display 450 displays the image, which includes the list of the content items, based on the control from list display controller 413 (refer to FIG. 7) of list controller 410. Moreover, display 450 displays the image of the content item, which is reproduced by content reproducer 433, based on the control from content reproducer 433 (refer to FIG. 9) of content controller 430.

Communication IF 460 is a communication interface for making communication with network 50. Communication IF 460 makes the NAT traversal communication with communication IF 160. Communication IF 460 is a communication interface of a type suitable for the communication with network 50. As the communication interface of such a type, for example, there are a wired LAN conforming to IEEE 802.3, a wireless LAN conforming to IEEE 802.11, and the like.

Communication IF 460 can make the communication, which is made between content receiving device 10 and each of list controller 410, thumbnail controller 420 and content controller 430, by the P2P communication. Communication IF 460 may make the communication, which is made between content receiving device 10 and each of thumbnail controller 420 and content controller 430, by communication that passes through server 30.

A description is made below of operations of content receiving system 1 configured as described above.

[1-2. Operations]

Figure 10:
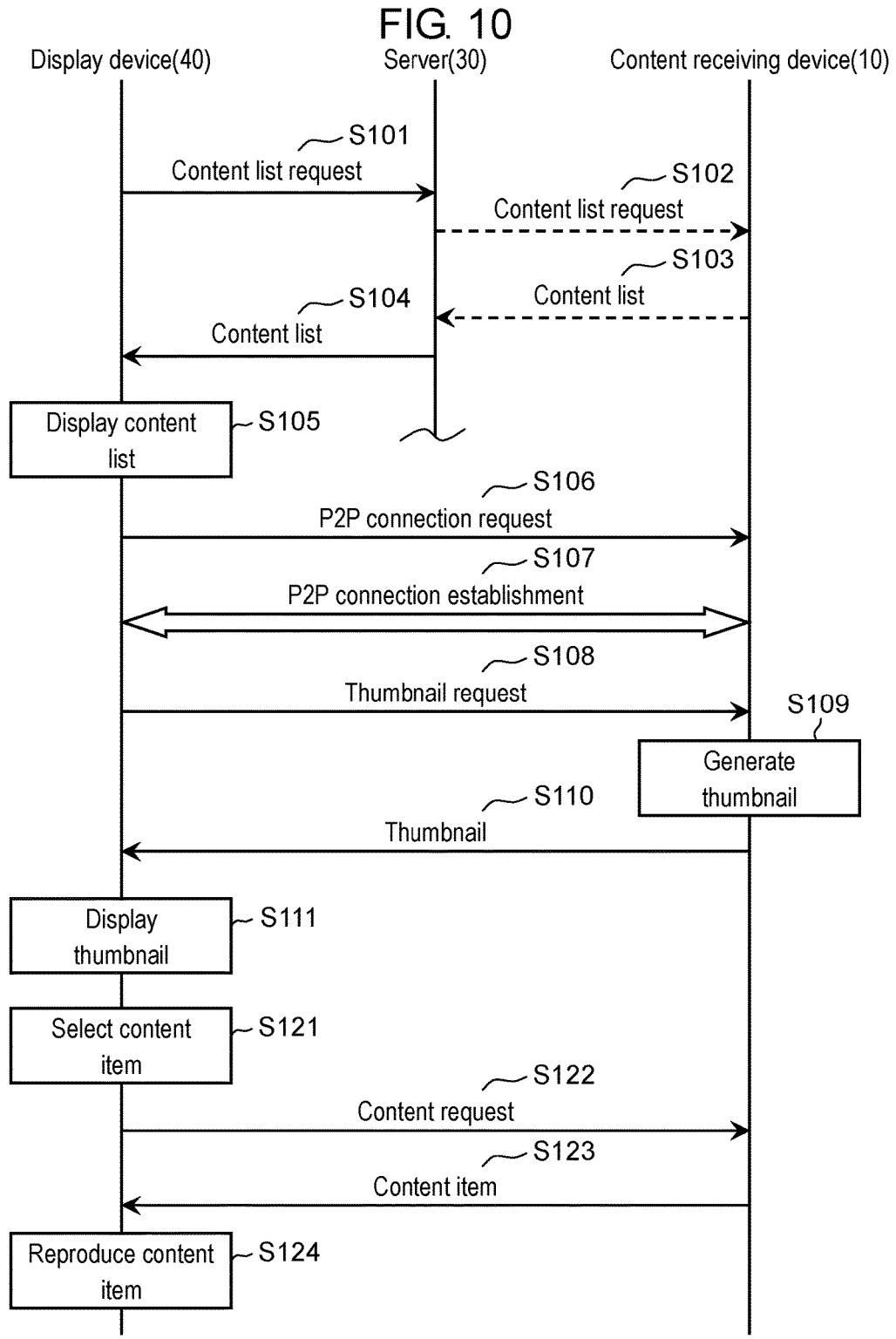
FIG. 10 is a sequence chart schematically showing an example of processing executed in the content receiving system in the first exemplary embodiment.

FIG. 10 is a sequence chart schematically showing an example of processing executed in content receiving system 1 in the first exemplary embodiment.

In the sequence chart shown in FIG. 10, there is shown a processing flow in which, in content receiving system 1, display device 40 acquires the list of the content items held by content receiving device 10, and thereafter, each of the content items included in the list is reproduced on display device 40.

List request transmitter 411 (refer to FIG. 7) of display device 40 transmits the acquisition request for the list of the content items to server 30 (Step S101).

Upon receiving the acquisition request for the list of the content items being transmitted from display device 40 in Step S101, server 30 transfers (transmits) the received acquisition request to content receiving device 10 (Step S102).

Upon receiving the acquisition request for the list of the content items being transferred from server 30 in Step S102, content receiving device 10 transmits the list of the content items, which are held by content receiving device 10, to server 30 based on the received acquisition request (Step S103).

Upon receiving the list of the content items transmitted from content receiving device 10 in Step S103, server 30 transmits the received list of the content items to display device 40 (Step S104).

Note that server 30 may transmit the list (list of the content items) held by server 30, to display device 40, in response to the acquisition request for the list of the content items being received by server 30 in Step S101 (Step S104). In this case, Step S102 and Step S103 are not executed.

Upon receiving the list of the content items transmitted from server 30 in Step S104, list display controller 413 (refer to FIG. 7) of display device 40 displays the image, which shows the received list of the content items, on display 450 (Step S105).

Communication IF 460 (refer to FIG. 6) of display device 40 makes a request for the P2P (Peer to Peer) connection to content receiving device 10 (Step S106).

Based on the request for the P2P connection in Step S106, the P2P connection is established between display device 40 and content receiving device 10 (Step S107).

Thumbnail request transmitter 421 (refer to FIG. 8) of display device 40 transmits the acquisition request for the thumbnail to content receiving device 10 (Step S108). This acquisition request is made by the P2P communication in which the connection is established in Step S107.

Thumbnail generator 142 (refer to FIG. 4) of content receiving device 10 generates the thumbnails of the content items held by content receiving device 10 (Step S109).

Thumbnail transmitter 143 (refer to FIG. 4) of content receiving device 10 transmits the thumbnails generated in Step S109, to display device 40 based on the acquisition request for the thumbnail being received in Step S108 (Step S110).

List display controller 413 (refer to FIG. 7) of display device 40 displays the thumbnails acquired in Step S109, on display 450 (Step S111). At this time, display device 40 displays the thumbnails, which correspond to the content items, on spots indicating the content items in the list of the content items being displayed in Step S105.

Setting unit 440 (refer to FIG. 6) of display device 40 accepts a selection operation for the content item by the user (Step S121).

For example, if display 450 includes a touch panel, the user touches one of the thumbnails displayed on display 450, and can thereby select a content item corresponding to the thumbnail. Alternatively, the user's selection operation may be performed in such a manner that the user moves a cursor by operating a user interface (not shown; for example, a key, a button, a touch pad, a pointing device, or the like) provided on display device 40, puts the cursor on one of the thumbnails displayed on display 450, and so on.

Content request transmitter 431 (refer to FIG. 9) of display device 40 transmits the acquisition request for the content item (content item designated by the user), which is selected by the user in Step S121, to content receiving device 10 (Step S122).

Content request receiver 151 (refer to FIG. 5) of content receiving device 10 receives the acquisition request for the content item being transmitted from display device 40 in Step S122, and content transmitter 153 (refer to FIG. 5) of content receiving device 10 transmits the content item, which corresponds to the acquisition request for the content item, to display device 40 (Step S123).

Content acquisition unit 432 (refer to FIG. 9) of display device 40 receives and acquires the content item, which is transmitted from content receiving device 10 in Step S123, and content reproducer 433 (refer to FIG. 9) of display device 40 reproduces the content item and displays the content item on display 450 (Step S124).

By a series of the above-described processing, in content receiving system 1, display device 40 can acquire the list of the content items held by content receiving device 10, and can display the acquired list on display 450. Then, display device 40 can acquire the content item, which is designated by the user from among the content items included in the list, from content receiving device 10, can reproduce the acquired content item, and can display the content item on display 450.

That is, the user can view the content item, which is designated by the user based on the thumbnail displayed on display 450 of display device 40 from among the plurality of content items held by content receiving device 10, on display 450 of display device 40.

Next, a description is made of the list of the content items displayed on display 450 of display device 40.

Figure 11:
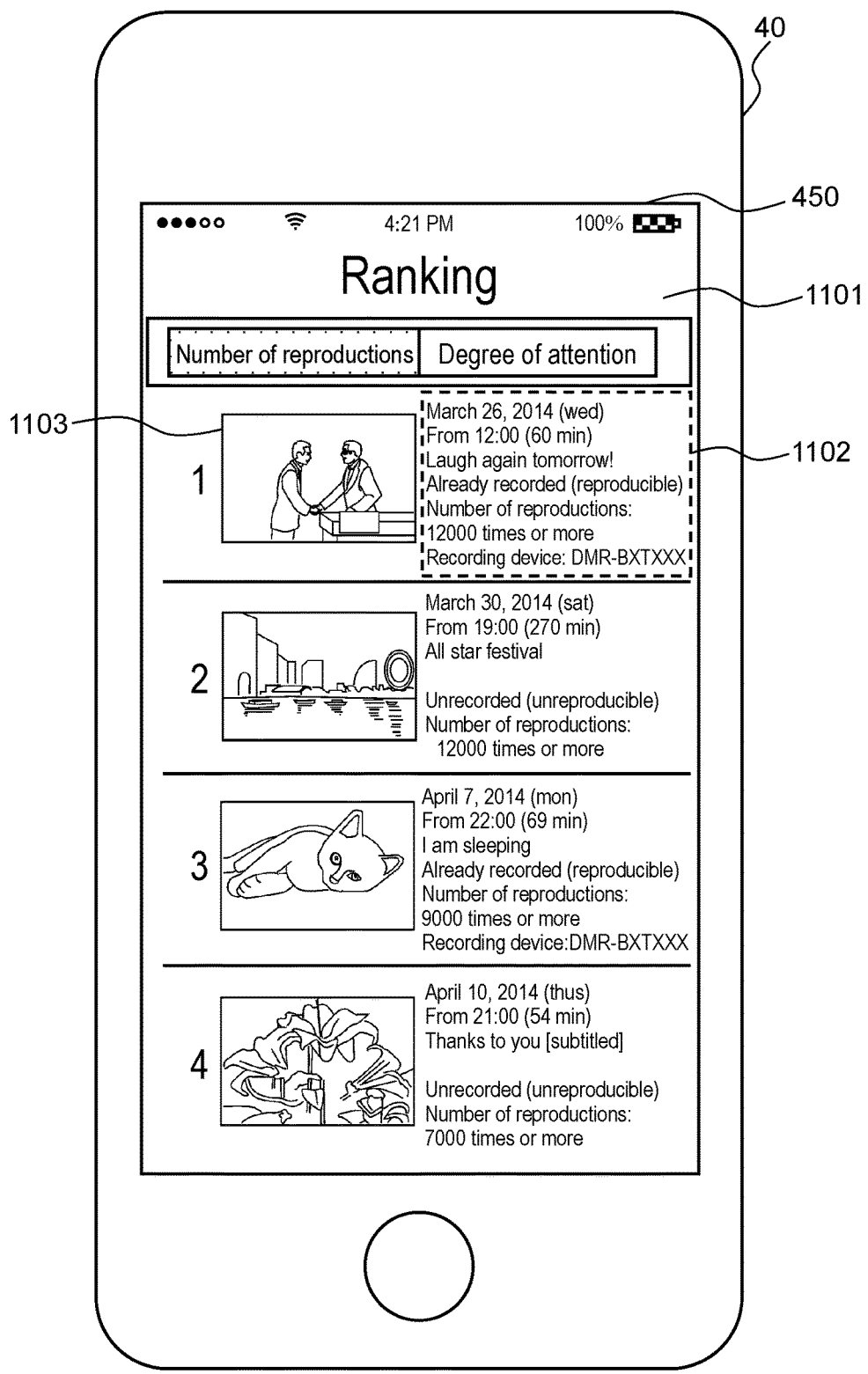
FIG. 11 is a diagram showing an example of an image displayed on the display device in the first exemplary embodiment.

FIG. 11 is a diagram showing an example of image 1101 displayed on display device 40 in the first exemplary embodiment. Image 1101 is a list of the content items, which includes the thumbnails.

As shown in FIG. 11, for the respective content items, image 1101 includes: portions 1102 showing titles and the like of the content items; and portions 1103 showing the thumbnails of the content items.

On each of portions 1102, the title of the content item is displayed, and further, information such as a broadcast time and number of diagrams of the content item and a device used for recording may be displayed by characters (text).

On each of portions 1103, the thumbnail of the content item is displayed. Moreover, portions 1103 are displayed next to portions 1102. This is to visually indicate that portions 1103 are the thumbnails of the content items shown by portions 1102. Note that portions 1103 do not always have to be displayed next to portions 1102. However, it is desired that portions 1102 and portions 1103 be displayed in a display mode which is easy for the user to recognize that portions 1102 and portions 1103 are associated with each other (for example, portions 1102 and portions 1103 are connected to each other by lines, a color of the characters or background of each of portions 1102 and a color of a frame of each of portions 1103 are set to the same or similar color, and so on).

As described above, in the first exemplary embodiment, on display 450 of display device 40, the images of the thumbnails are displayed in addition to the display of the titles and the like of the content items by the characters for each of the content items. Hence, the user who is to select and view, on display device 40, the content item stored in content receiving device 10 can confirm the content item as a selection target visually and more easily.

[1-3. Effects]

As described above, the content receiving system in this exemplary embodiment includes: the content receiving device; the server; and the display device. The content receiving device includes: the first receiver that receives a content item; the list transmitter; the thumbnail generator; and the thumbnail transmitter. The list transmitter transmits the list, which includes the information indicating the content item received by the first receiver, to the display device through the server. The thumbnail generator generates a thumbnail of the content item received by the first receiver. The thumbnail transmitter transmits the thumbnail generated by the thumbnail generator, to the display device. The display device includes: the second receiver; and the display. The second receiver receives the list transmitted by the list transmitter, and the thumbnail transmitted by the thumbnail transmitter. The display displays an image in which a thumbnail of a content item among a plurality of the thumbnails received by the second receiver is associated with the information included in the list received by the second receiver, the thumbnail of the content item corresponding to the information.

In this content receiving system, after generating the thumbnail of the acquired content item, the content receiving device directly transmits the generated thumbnail to the display device without passing through the server.

In a case where it is assumed that the server holds such thumbnails, and the thumbnails are supplied from the server to the display device, the server must include a storage device provided with a storage capacity necessary for retaining the thumbnails. Moreover, a communication line is required, which is provided with a channel capacity that enables the thumbnails to be transmitted from the content receiving device to the server, and enables the thumbnails to be transmitted from the server to the display device. Then, as the number of such content receiving devices connected to the server is increased, the storage capacity of the storage device, which is necessary for retaining the thumbnails, is increased, and moreover, the channel capacity of the communication line, which is necessary for transmitting and receiving the thumbnails, is increased.

In the content receiving system of which example is illustrated in this exemplary embodiment, the server does not have to retain the thumbnails in the series of processing in which the display device acquires the thumbnails from the content receiving device. Hence, the server does not have to include a storage device with a large storage capacity for retaining the thumbnails. Moreover, for the communication line that connects the server thereto, a communication line with a large channel capacity necessary for transmitting and receiving the thumbnails does not have to be used. Hence, in the content receiving system shown in this exemplary embodiment, the increase in the storage capacity of the storage device provided in the server can be suppressed, and moreover, the increase in the channel capacity of the communication line that connects the server thereto can be suppressed.

Note that content receiving system 1 is an example of the content receiving system. Content receiving device 10 is an example of the content receiving device. Server 30 is an example of the server. Display device 40 is an example of the display device. Content receiver 110 is an example of the first receiver. List transmitter 133 is an example of the list transmitter. Thumbnail generator 142 is an example of the thumbnail generator. Thumbnail transmitter 143 is an example of the thumbnail transmitter. List acquisition unit 412 is an example of the second receiver. Display 450 is an example of the display. Image 1101 is an example of the image displayed on the display.

Second Exemplary Embodiment

A description is made below of the second exemplary embodiment with reference to FIG. 12 and FIG. 13.

In the second exemplary embodiment, a description is made of a configuration in which the content receiving system includes a plurality of the content receiving devices.

Note that, in the following, the same reference numerals are assigned to substantially the same constituent elements or functional blocks as the constituent elements or the functional blocks in the first exemplary embodiment, and a detailed description thereof is omitted.

[2-1. Configuration]

Figure 12:
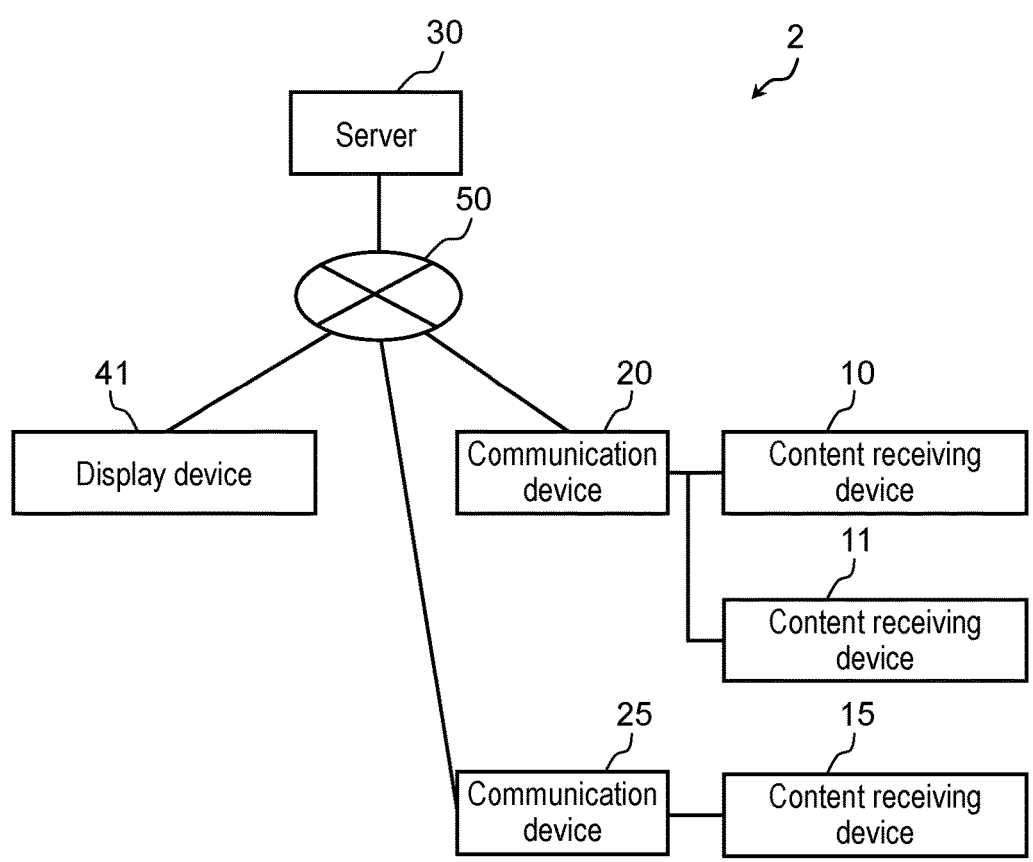
FIG. 12 is a diagram schematically showing an example of a system configuration of a content receiving system in a second exemplary embodiment.

FIG. 12 is a diagram schematically showing an example of a system configuration of content receiving system 2 in the second exemplary embodiment.

As shown in FIG. 12, content receiving system 2 includes: the plurality of content receiving devices (content receiving device 10, content receiving device 11, and content receiving device 15); a plurality of communication devices (communication device 20 and communication device 25); server 30; and display device 41.

Note that the number of the content receiving devices provided in content receiving system 2 is not limited to three, and the number of communication devices provided in content receiving system 2 is not limited to two.

Server 30 shown in FIG. 12 is substantially the same as server 30 shown in the first exemplary embodiment, content receiving devices 10, 11, 15 shown in FIG. 12 are substantially the same as content receiving device 10 shown in the first exemplary embodiment, and communication devices 20 and 25 shown in FIG. 12 are substantially the same as communication device 20 shown in the first exemplary embodiment, and accordingly, detailed descriptions of these devices are omitted.

Each of content receiving devices 10, 11 is connected to communication device 20, and is connected to network 50 through communication device 20. Each of content receiving devices 10, 11 communicates with respective devices, which are connected to network 50, by using the NAT function of communication device 20.

Content receiving device 15 is connected to communication device 25, and is connected to network 50 through communication device 25. Content receiving device 15 communicates with the respective devices, which are connected to network 50, by using the NAT function of communication device 25.

Display device 41 is a display terminal that displays a list of a plurality of content items, which are held by each of content receiving devices 10, 11, 15, and thumbnails of these content items, and is thereby capable of presenting a list of content items held by each of content receiving devices 10, 11, 15. As described above, display device 41 shown in FIG. 12 is different from display device 40 shown in the first exemplary embodiment in the point of acquiring the information regarding the content items from the plurality of content receiving devices. However, except for this point, display device 41 is substantially the same as display device 40 shown in the first exemplary embodiment.

That is, operations when display device 41 acquires the information regarding each of the content items from one content receiving device among the plurality of content receiving devices are substantially the same as the operations described in the first exemplary embodiment. Hence, a detailed description regarding display device 41 is omitted.

A description is made below of the operations of content receiving system 2 configured as described above.

[2-2. Operations]

Figure 13:
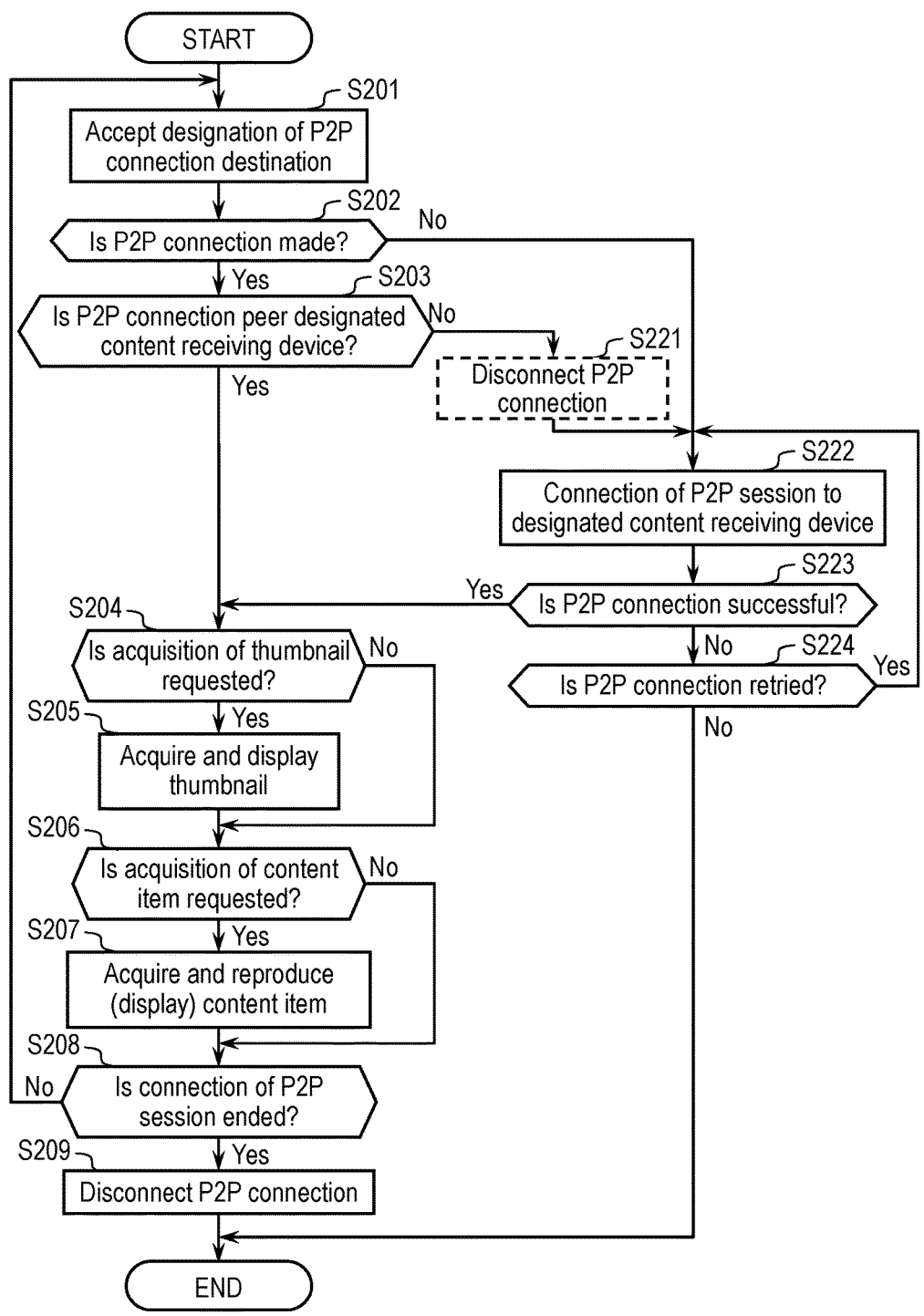
FIG. 13 is a flowchart showing an example of processing in a case of acquiring information regarding a content item in a display device in the second exemplary embodiment.

FIG. 13 is a flowchart showing an example of processing in a case of acquiring the information regarding the content item in display device 41 in the second exemplary embodiment.

The flowchart shown in FIG. 13 corresponds to the processing of display device 40 from Step S106 to Step S111, which is shown in FIG. 10 in the first exemplary embodiment.

From thumbnail request transmitter 421 (refer to FIG. 8), communication IF 460 (refer to FIG. 6) of display device 41 accepts information (hereinafter, also referred to as a "device ID") designating the content receiving device, which serves as an acquisition destination of the thumbnail (Step S201). This designation is for designating from which of content receiving devices 10, 11, 15 display device 41 receives the thumbnail.

Communication IF 460 determines whether or not communication IF 460 is P2P-connected to any of content receiving devices 10, 11, 15 (Step S202).

When it is determined in Step S202 that communication IF 460 is P2P-connected to any of content receiving devices 10, 11, 15 (Yes in Step S202), the processing proceeds to Step S203, and when it is determined in Step S202 that communication IF 460 is not P2P-connected to any of content receiving devices 10, 11, 15 (No in Step S202), the processing proceeds to Step S222.

Communication IF 460 determines whether or not the content receiving device P2P-connected thereto is the content receiving device designated in Step S201 (Step S203).

When it is determined in Step S203 that the content receiving device P2P-connected thereto is the content receiving device designated in Step S201 (Yes in Step S203), the processing proceeds to Step S204. When it is determined in Step S203 that the content receiving device P2P-connected thereto is not the content receiving device designated in Step S201 (No in Step S203), communication IF 460 disconnects the active P2P connection (Step S221). After Step S221, the processing proceeds to Step S222.

Communication IF 460 makes the P2P connection with the content receiving device designated in Step S201 (Step S222).

Communication IF 460 determines whether or not the P2P connection in Step S222 is successful (Step S223).

When it is determined in Step S223 that the P2P connection is successful (Yes in Step S223), the processing proceeds to Step S204.

When it is determined in Step S223 that the P2P connection is not successful (No in Step S223), communication IF 460 determines whether or not to retry the P2P connection (Step S224).

When it is determined in Step S224 to retry the P2P connection (Yes in Step S224), the processing returns to Step S222, and processing of Step S222 and the subsequent steps are executed.

When it is determined in Step S224 not to retry the P2P connection (No in Step S224), the processing is ended.

Thumbnail controller 420 (refer to FIG. 6, FIG. 8) determines whether or not a request has been made to acquire the thumbnail (Step S204). Note that the determination of Step S204 may be performed, for example, based on whether or not thumbnail controller 420 receives a control signal for acquiring the thumbnail.

When it is determined in Step S204 that a request has been made to acquire the thumbnail (Yes in Step S204), thumbnail controller 420 (refer to FIG. 6, FIG. 8) acquires the thumbnail from the content receiving device (for example, content receiving device 10) P2P-connected thereto (Step S205). When it is determined in Step S204 that a request has not been made to acquire the thumbnail (No in Step S204), the processing proceeds to Step S206.

In Step S205, during the P2P connection performed once, thumbnail controller 420 acquires all of thumbnails, which should be acquired, from content receiving device P2P-connected thereto. That is, the content receiving device, to which display device 41 is P2P-connected, generates the thumbnails of one or a plurality of content items requested from thumbnail controller 420, and transmits the generated thumbnails to display device 41.

After acquiring all of the thumbnails, which should be acquired, from the content receiving device (for example, content receiving device 10) P2P-connected to communication IF 460, thumbnail controller 420 sequentially acquires the thumbnails from other content receiving devices (for example, content receiving devices 11, 15). Moreover, display 450 (refer to FIG. 6) displays the acquired thumbnails on display 450.

Content controller 430 (refer to FIG. 6, FIG. 9) determines whether or not a request has been made to acquire the content item (Step S206). Note that the determination of Step S206 may be performed, for example, based on whether or not content controller 430 receives a control signal for acquiring the content item.

When it is determined in Step S206 that a request has been made to acquire the content item (Yes in Step S206), content controller 430 acquires the content item (content item designated by the user) from the content receiving device (for example, content receiving device 10) P2P-connected to communication IF 460, and content reproducer 433 (refer to FIG. 9) reproduces the acquired content item and displays the content item on display 450 (Step S207). When it is determined in Step S206 that a request has not been made to acquire the content item (No in Step S206), the processing proceeds to Step S208.

Communication IF 460 determines whether or not to end the P2P connection (Step S208). In Step S208, in a case where the thumbnails are acquired with regard to all of the content items included in the list acquired by list controller 410, communication IF 460 determines to end the P2P connection, and if the content item for which the thumbnail is not acquired is present in the content items included in the list acquired by list controller 410, communication IF 460 determines not to end the P2P connection.

In Step S208, when communication IF 460 determines to end the P2P connection (Yes in Step S208), communication IF 460 disconnects the P2P connection (Step S209). In this way, a series of the processing shown in the flowchart of FIG. 13 is ended.

In Step S208, when communication IF 460 determines not to end the P2P connection (No in Step S208), the processing returns to Step S201. Then, display device 41 continues the processing in order to acquire the unacquired thumbnail.

Note that display device 41 may be individually P2P-connected to the plurality of content receiving devices at the same time. That is, display device 41 may operate so as not to execute the processing of Step S221 and not to disconnect the P2P connection. In this case, display device 41 can be individually P2P-connected to the plurality of content receiving devices at the same time, and can sequentially communicate with the content receiving devices with which display device 41 needs to communicate.

Moreover, in this case, display device 41 may sequentially acquire the thumbnails for each of the content receiving devices, or may simultaneously acquire the thumbnails from the plurality of content receiving devices in parallel.

[2-3. Effects]

In the content receiving system in this exemplary embodiment configured as described above, after generating the thumbnails of the acquired content items, the plurality of content receiving devices connected to the system directly transmit the generated thumbnails to the display device without passing through the server.

In a case where it is assumed that the server holds such thumbnails, and the thumbnails are supplied from the server to the display device, the server must include a storage device provided with a storage capacity necessary for retaining the thumbnails. Moreover, a communication line is required, which is provided with a channel capacity that enables the thumbnails to be transmitted from the content receiving device to the server, and enables the thumbnails to be transmitted from the server to the display device. Then, as the number of such content receiving devices connected to the server is increased, the storage capacity of the storage device, which is necessary for retaining the thumbnails, is increased, and moreover, the channel capacity of the communication line, which is necessary for transmitting and receiving the thumbnails, is increased.

In the content receiving system of which example is illustrated in this exemplary embodiment, the server does not have to retain the thumbnails in the series of processing in which the display device acquires the thumbnails from the plurality of content receiving devices. Hence, the server does not have to include a storage device with a large storage capacity for retaining the thumbnails. Moreover, for the communication line that connects the server thereto, a communication line with a large channel capacity necessary for transmitting and receiving the thumbnails does not have to be used. Hence, in the content receiving system shown in this exemplary embodiment, the increase in the storage capacity of the storage device provided in the server can be suppressed, and moreover, the increase in the channel capacity of the communication line that connects the server thereto can be suppressed.

Third Exemplary Embodiment

In a third exemplary embodiment, a description is made of essential constituent elements of the content receiving systems described in the first and second exemplary embodiments.

[3-1. Configuration]

Figure 14:
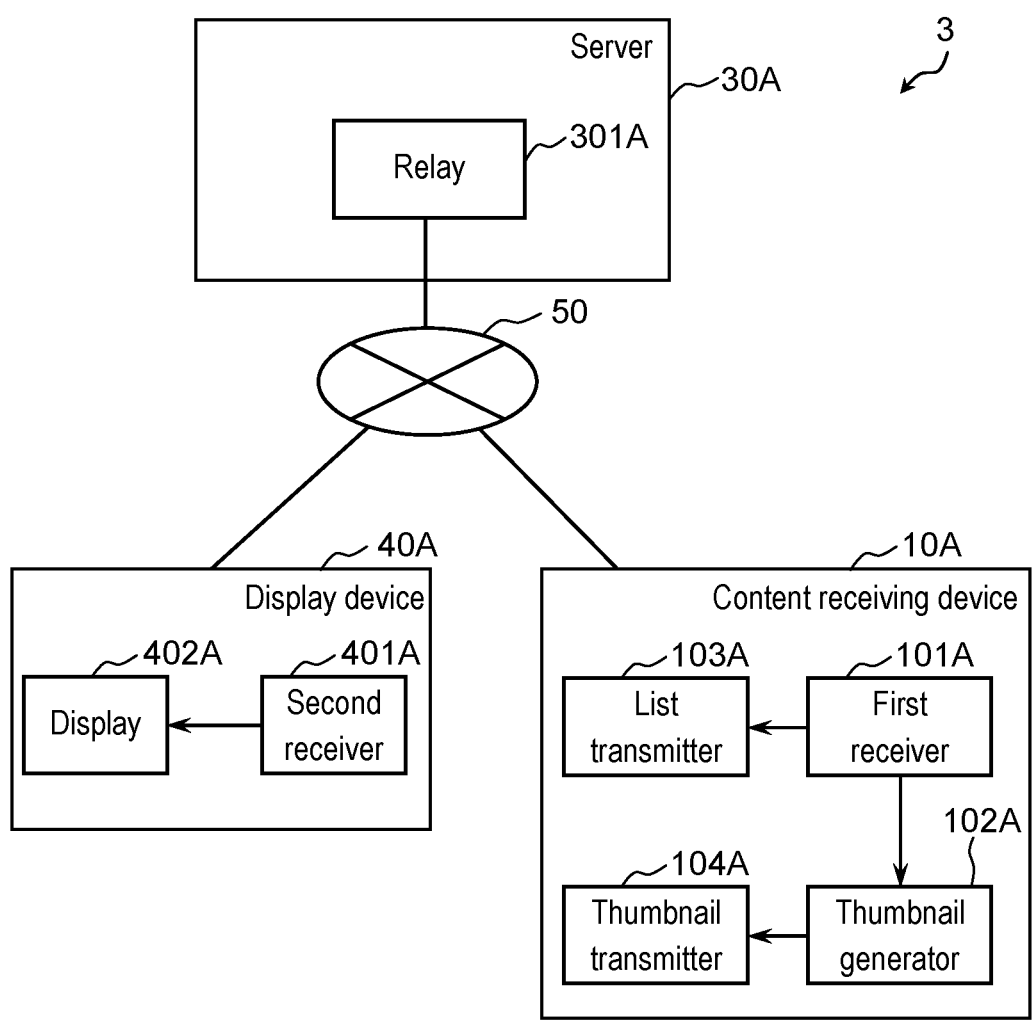
FIG. 14 is a diagram schematically showing an example of a system configuration of a content receiving system in a third exemplary embodiment.

FIG. 14 is a diagram schematically showing an example of a system configuration of content receiving system 3 in the third exemplary embodiment.

As shown in FIG. 14, content receiving system 3 includes: content receiving device 10A; server 30A; and display device 40A for displaying content items acquired by content receiving device 10A. Server 30 includes relay 301A that relays information. Content receiving device 10A includes: first receiver 101A that receives content items; list transmitter 103A; thumbnail generator 102A that generates thumbnails of the content items received by first receiver 101A; and thumbnail transmitter 104A that transmits the thumbnails generated by thumbnail generator 102A, to display device 40A. List transmitter 103A transmits a list, which includes information indicating the content items received by first receiver 101A, to display device 40A through a relay made by relay 301A. Display device 40A includes: second receiver 401A; and display 402A. Second receiver 401A receives the list transmitted by list transmitter 103A, and the thumbnails transmitted by thumbnail transmitter 104A. Display 402A displays an image in which the thumbnail of the content item among the thumbnails received by second receiver 401A is associated with information included in the list received by second receiver 401A, the thumbnail of the content item corresponding to the information.

[3-2. Effects]

In this way, after generating the thumbnail of the acquired content item, the content receiving device can transmit the generated thumbnail to the display device directly without passing through the server.

In a case where it is assumed that the server holds such thumbnails, and the thumbnails are supplied from the server to the display device, the server must include a storage device provided with a storage capacity necessary for retaining the thumbnails. Moreover, a communication line is required, which is provided with a channel capacity that enables the thumbnails to be transmitted from the content receiving device to the server, and enables the thumbnails to be transmitted from the server to the display device. Then, as the number of such content receiving devices connected to the server is increased, the storage capacity of the storage device, which is necessary for retaining the thumbnails, is increased, and moreover, the channel capacity of the communication line, which is necessary for transmitting and receiving the thumbnails, is increased.

In the content receiving system of which example is illustrated in this exemplary embodiment, the server does not have to retain the thumbnails in the series of processing in which the display device acquires the thumbnails from the content receiving device. Hence, the server does not have to include a storage device with a large storage capacity for retaining the thumbnails. Moreover, for the communication line that connects the server thereto, a communication line with a large channel capacity necessary for transmitting and receiving the thumbnails does not have to be used. Hence, in the content receiving system shown in this exemplary embodiment, the increase in the storage capacity of the storage device provided in the server can be suppressed, and moreover, the increase in the channel capacity of the communication line that connects the server thereto can be suppressed.

Fourth Exemplary Embodiment

In a fourth exemplary embodiment, a description is made of a content receiving device effective for enhancing convenience for a user in a case of presenting, to the user, thumbnails as a list of content items acquired from broadcast waves and the like. The content receiving device shown in this exemplary embodiment shortens a time required from the reception of an acquisition request for the thumbnail until the transmission of the thumbnails to the display device, and thereby achieves the enhancement of the convenience for the user.

A description is made below of the fourth exemplary embodiment with reference to FIG. 15 to FIG. 20.

Note that, in the following, the same reference numerals are assigned to substantially the same constituent elements or functional blocks as the constituent elements or the functional blocks described in the first to third exemplary embodiments, and a detailed description thereof is omitted.

[4-1. Configuration]

Figure 15:
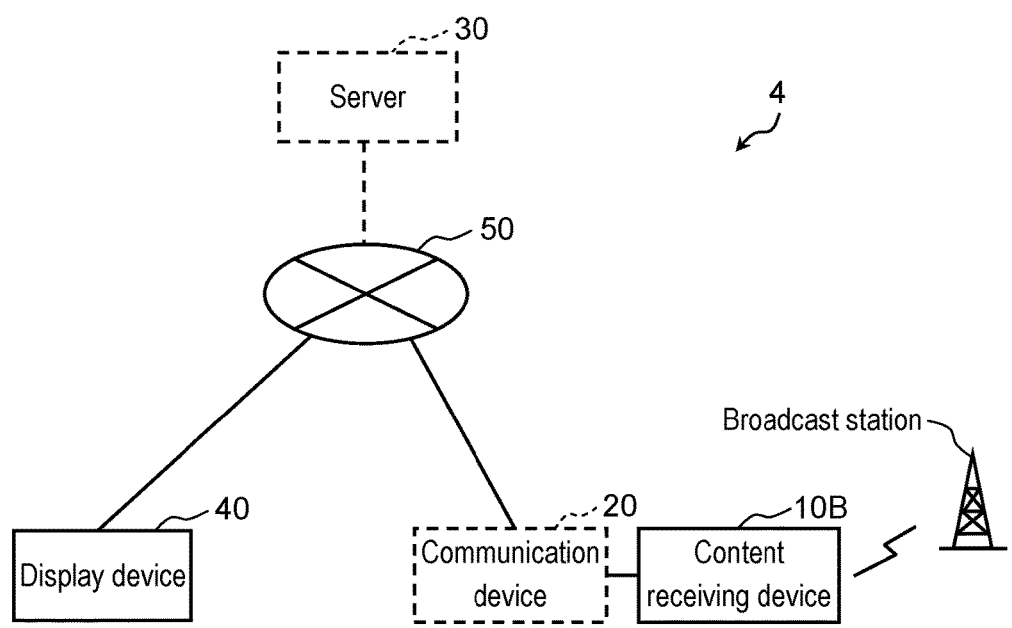
FIG. 15 is a diagram schematically showing an example of a system configuration of a content receiving system in a fourth exemplary embodiment.

FIG. 15 is a diagram schematically showing an example of a system configuration of content receiving system 4 in the fourth exemplary embodiment.

As shown in FIG. 15, content receiving system 4 includes: content receiving device 10B; and display device 40. Content receiving device 10B and display device 40 are individually connected to network 50, and are communicable with each other.

Note that content receiving system 4 may include communication device 20 on a communication path between content receiving device 10B and network 50, and moreover, may include server 30 connected to network 50. However, in content receiving system 4, communication device 20 and server 30 are not essential constituent elements.

Figure 16:
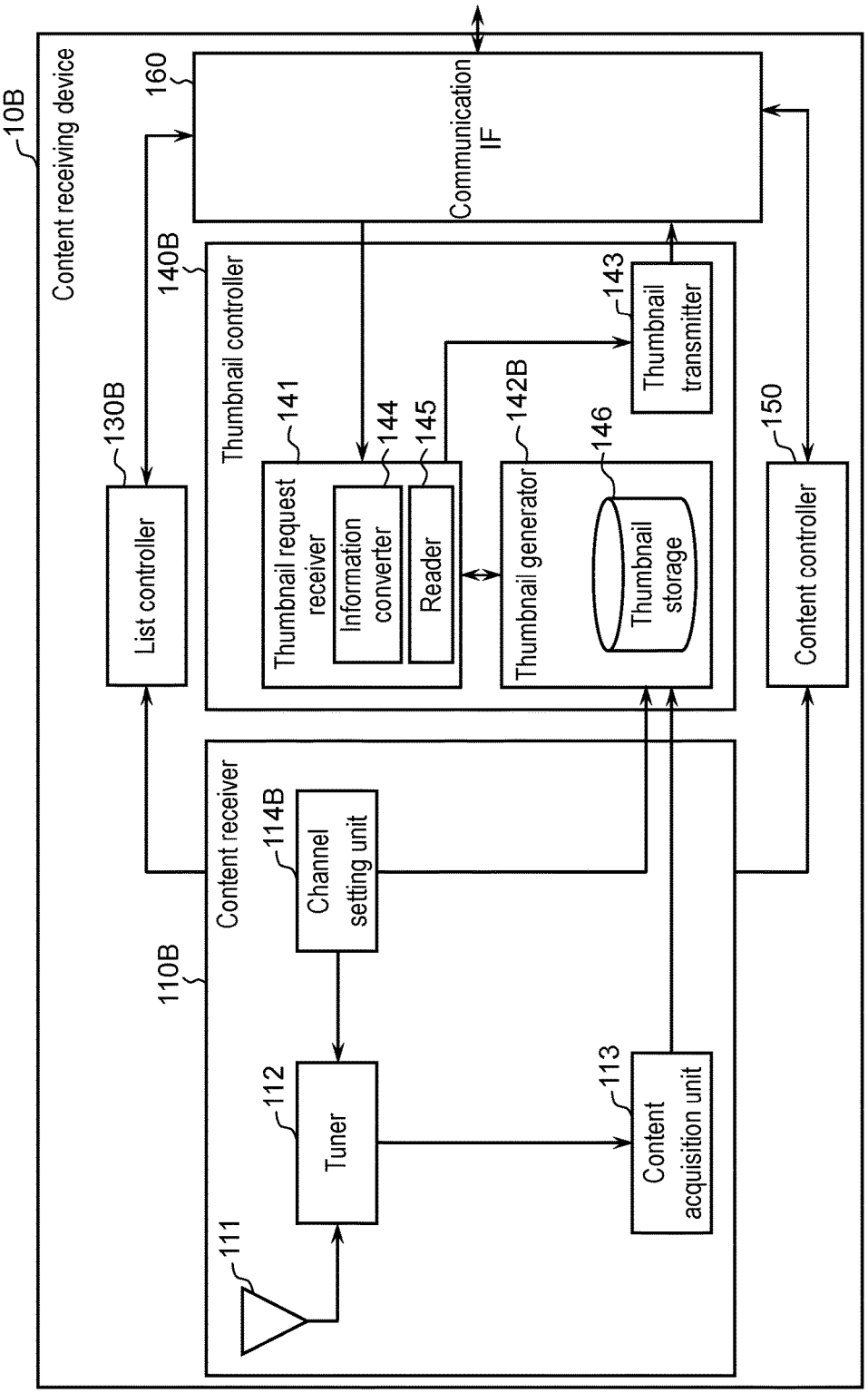
FIG. 16 is a block diagram schematically showing an example of a configuration of a content receiving device in the fourth exemplary embodiment.

FIG. 16 is a block diagram schematically showing an example of a configuration of content receiving device 10B in the fourth exemplary embodiment.

As shown in FIG. 16, content receiving device 10B includes: content receiver 110B; list controller 130B; thumbnail controller 140B; content controller 150; and communication IF 160.

Content receiver 110B, list controller 130B, and thumbnail controller 140B have substantially the same functions as those of content receiver 110, list controller 130, and thumbnail controller 140, which are described in the first exemplary embodiment, respectively, and further, also have functions which are not provided in these functional blocks. A description is made below of such functions.

Note that content controller 150 and communication IF 160, which are provided in content receiving device 10B, are substantially the same as content controller 150 and communication IF 160, which are described in the first exemplary embodiment, and accordingly, a detailed description thereof is omitted.

Content receiver 110B is configured to be capable of acquiring a content item from a broadcast wave broadcast from a broadcast station in a similar way to content receiver 110 described in the first exemplary embodiment. Moreover, content receiver 110B holds a list indicating broadcast stations, which are receivable by content receiver 110B, in advance, and can generate thumbnails of content items of the broadcast stations, which are included in this list, in advance.

Content receiver 110B includes: antenna 111; tuner 112; content acquisition unit 113; and channel setting unit 114B.

Antenna 111 is an antenna circuit for receiving the broadcast wave including the content item. For example, antenna 111 can receive respective broadcast waves of terrestrial digital broadcasting, BS (Broadcasting Satellite) broadcasting, CS (Communication Satellite) broadcasting, and the like. Hereinafter, each of the broadcast waves of the terrestrial digital broadcasting, the BS broadcasting, the CS broadcasting and the like, each having a different broadcast system, is also referred to as a "tuner source". That is, the terrestrial digital broadcasting is an example of the tuner source, the BS broadcasting is an example of the tuner source, and the CS broadcasting is an example of the tuner source. Note that, in place of antenna 111 that receives the broadcast wave, a cable modem may be used, which receives a broadcast signal of a cable television broadcasting, which is transmitted through a cable in order to transmit the broadcast signal.

Tuner 112 is a demodulation circuit that demodulates a broadcast signal of a predetermined frequency band (hereinafter, also referred to as a "channel") from the broadcast wave received by antenna 111. For example, the predetermined channel may be a channel designated by the user, a channel for which recording reservation is made (or viewing reservation is made), and the like. For example, the channel taken as a target of the demodulation by tuner 112 is identified by channel numbers (for example, channel 13, channel 26, and the like). Channel setting unit 114B sets or changes the channel number of the channel taken as the target of the demodulation by tuner 112.

Content acquisition unit 113 is a processor that acquires the content item from the broadcast signal demodulated by tuner 112.

Channel setting unit 114B is a processor that sets the channel in the broadcast wave, which is demodulated by tuner 112, to tuner 112. Channel setting unit 114B holds a list of the broadcast stations receivable by content receiver 110B, that is, a list of channels, which can be demodulated by tuner 112, as a demodulation list in advance. Channel setting unit 114B sequentially sets each of channel numbers of the respective channels, which are included in the demodulation list, to tuner 112, and in addition, after making this setting (for example, after a predetermined time has elapsed after this setting), channel setting unit 114B sends a notification to urge the generation of the thumbnails to thumbnail generator 142B.

List controller 130B transmits a list of channels, which are receivable by content receiver 110B, to display device 40 through communication IF 160. The list of the channels is also a list of broadcast stations associated with the channels, and accordingly, is hereinafter also referred to as "broadcast station list". Details of list controller 130B will be described later with reference to FIG. 18.

In response to the acquisition request for the thumbnail being transmitted from display device 40, thumbnail controller 140B transmits the thumbnail, which is generated in such a manner that content receiver 110B receives the content item, to display device 40 through communication IF 160. Specifically, thumbnail controller 140B receives an acquisition request for the thumbnail, the acquisition request including identification information for identifying one broadcast station, from display device 40. Then, based on the received acquisition request for the thumbnail, thumbnail controller 140B transmits the thumbnail of the content item, which is broadcast from the one broadcast station identified by the identification information, to display device 40.

Thumbnail controller 140B includes: thumbnail request receiver 141; thumbnail generator 142B; and thumbnail transmitter 143.

Thumbnail request receiver 141 is a processor that receives the acquisition request for the thumbnail from display device 40 through communication IF 160.

Thumbnail request receiver 141 includes: information converter 144; and reader 145.

When the acquisition request for the thumbnail is received by thumbnail request receiver 141, reader 145 reads out the thumbnail from thumbnail storage 146 based on the acquisition request. Then, thumbnail request receiver 141 transmits the thumbnail read out from thumbnail storage 146, to display device 40 through thumbnail transmitter 143 and communication IF 160.

As described in the first exemplary embodiment, the identification information may be included in the acquisition request for the thumbnail. In a case where the identification information is included in the acquisition request for the thumbnail, reader 145 of thumbnail request receiver 141 reads out the thumbnail, which corresponds to the broadcast station identified by the identification information, from thumbnail storage 146. Note that "the thumbnail corresponding to the broadcast station" means a thumbnail of a content item, which is broadcast from the broadcast station.

Information converter 144 is a processor that converts the identification information, which is included in the acquisition request for the thumbnail being received by thumbnail request receiver 141, into information with a format suitable for acquiring the thumbnail from thumbnail generator 142B. The information with a format suitable for acquiring the thumbnail from thumbnail generator 142B is, for example, the channel number. That is, in a case where the identification information for identifying the broadcast station, the identification information being included in the acquisition request for the thumbnail transmitted from display device 40, is not the channel number, information converter 144 converts the identification information into the channel number.

Thumbnail request receiver 141 acquires the thumbnail from thumbnail generator 142B by using the channel number obtained by the conversion by information converter 144.

Thumbnail generator 142B generates each thumbnail of a plurality of the content items acquired by content acquisition unit 113. A generation method of the thumbnail is the same as that described in the first exemplary embodiment. Thumbnail generator 142B receives a notification (notification to urge the generation of the thumbnail) sent from channel setting unit 114B, and generates the thumbnail. Then, thumbnail generator 142B retains the generated thumbnail in thumbnail storage 146.

Thumbnail storage 146 is a storage device that retains the thumbnail generated by thumbnail generator 142B. Thumbnail storage 146 is an example of a storage. Content receiving device 10B may include thumbnail storage 146 as an independent storage device (for example, an HDD or a semiconductor storage element), or may use, as thumbnail storage 146, a part of storage 120 (refer to FIG. 2, not shown in FIG. 16) provided in content receiving device 10B.

Note that the list of the channels demodulated by tuner 112 may be grouped for each tuner source (for example, a list of channels regarding terrestrial digital broadcasting, a list of channels regarding BS broadcasting, a list of channels regarding CS broadcasting, and the like). Moreover, an update frequency of the thumbnail may be set for each of the channels or for each of the tuner sources. A specific example is mentioned. For example, the update frequency may be set so that the thumbnail of the terrestrial digital broadcasting can be updated every time (that is, every time when the acquisition request for the thumbnail regarding the terrestrial digital broadcasting is transmitted from display device 40). Alternatively, the update frequency may be set so that the thumbnail of the BS broadcasting can be updated every other time (that is, upon receiving the acquisition request for the thumbnail being transmitted from display device 40 twice, content receiving device 10B updates the thumbnail regarding the BS broadcasting once). If it is possible to set the update frequency of the thumbnail as described above, the update frequency of the thumbnail displayed on display device 40 can be changed in response to a frequency of use of the user, and the convenience for the user can be enhanced.

Thumbnail transmitter 143 transmits the thumbnail generated by thumbnail generator 142B, to display device 40 through communication IF 160. Specifically, thumbnail transmitter 143 acquires a thumbnail, which corresponds to the channel number identified by the identification information received by thumbnail request receiver 141, from thumbnail storage 146 through reader 145. Then, thumbnail transmitter 143 transmits the acquired thumbnail as a response to the acquisition request for the thumbnail being transmitted from display device 40, to display device 40 which is a transmission source of the acquisition request for the thumbnail. Note that thumbnail transmitter 143 is an example of a transmitter.

Note that, in a case where information for identifying a plurality of the channels is included in the identification information included in the acquisition request for the thumbnail being received by thumbnail request receiver 141, thumbnail transmitter 143 may acquire a plurality of the thumbnails, which individually correspond to the plurality of channels, from thumbnail storage 146, and may transmit the plurality of thumbnails to display device 40.

Note that, at the time of transmitting the plurality of thumbnails, thumbnail transmitter 143 may transmit the plurality of thumbnails sequentially one by one, or may generate one electronic file that houses the plurality of thumbnails therein, and may transmit the generated electronic file. For example, thumbnail transmitter 143 may generate one animation GIF file or a moving image file, which has the plurality of thumbnails individually as image frames, and may transmit the generated file.

Display device 40 receives the broadcast station list transmitted by list controller 130B, and displays the received broadcast station list on display 450. At this time, display device 40 superimposes the thumbnail, which is transmitted from thumbnail transmitter 143 and received by display device 40, on an image showing the broadcast station list, and displays the thumbnail on display 450. As described in the first exemplary embodiment, display device 40 may periodically update the thumbnail displayed on display 450.

Note that content receiving device 10B may include a plurality of tuners 112. In content receiving device 10B configured as described above, content acquisition unit 113 can simultaneously acquire a plurality of the content items from broadcast waves of a plurality of the channels. Then, thumbnail generator 142 can acquire those content items from content receiver 110B, and can generate a plurality of thumbnails individually corresponding to the plurality of channels.

FIG. 17 is a diagram schematically showing an example of the attached information retained in thumbnail storage 146 of content receiving device 10B in the fourth exemplary embodiment.

The attached information is information related to the thumbnail retained in thumbnail storage 146, and is information indicating a list of information by which the thumbnails are identifiable. The attached information is used when reader 145 confirms whether or not the thumbnail corresponding to the broadcast station identified by the identification information is retained in thumbnail storage 146, and when reader 145 reads out the thumbnail.

The attached information includes one or more records, each including a generation date/time, a channel number, and a file path. In the example shown in FIG. 17, one row corresponds to one record. Then, one record is associated with one thumbnail.

The generation date/time is information indicating a date and a time when the thumbnail associated with the record is generated. A character string indicating the date and the time may be arbitrary. For example, a character string may be used, in which numeric values indicating a Christian Era year, month, day, hour, minute and second of the date and the time when the thumbnail is generated are coupled to one another. In an example of a record shown in a first row of FIG. 17, the generation date/time "20141210123015" indicates that the date and the time when the thumbnail is generated are Dec. 10, 2014 at 12:30:15.

The channel number is information indicating the channel number of the channel that broadcasts the content item indicated by the thumbnail associated with the record. In the example of the record shown in the first row of FIG. 17, the channel number "8" indicates that the content item indicated by the thumbnail associated with the record is broadcast on Channel 8.

The file path is information indicating a place where the thumbnail associated with the record is retained (that is, a place where the thumbnail is retained in thumbnail storage 146), and indicating a file name of the thumbnail.

A description is made below of the operations of content receiving system 4 configured as described above.

[4-2. Operations]

Figure 18:
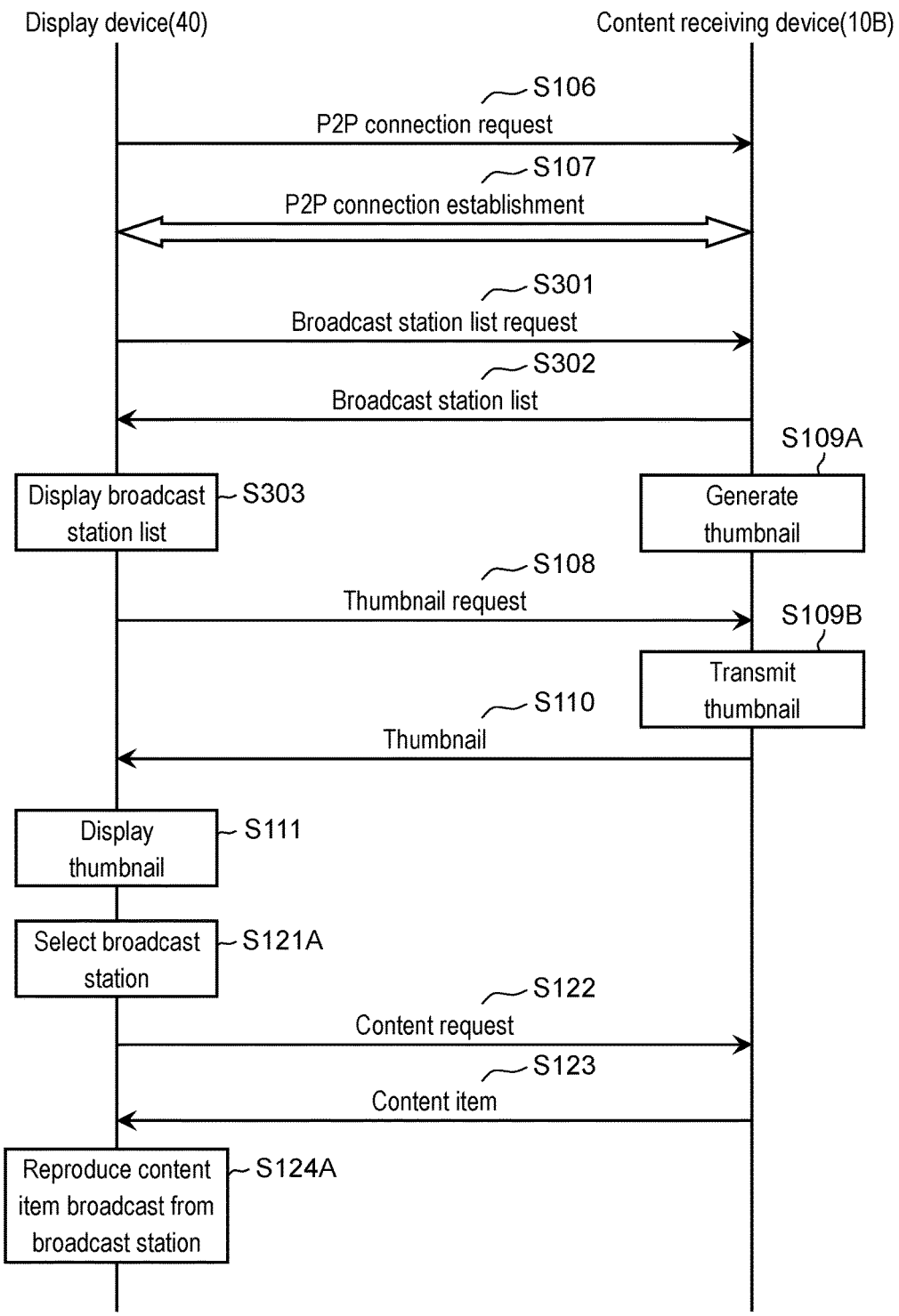
FIG. 18 is a sequence chart schematically showing an example of processing executed in a content receiving system in the fourth exemplary embodiment.

FIG. 18 is a sequence chart schematically showing an example of processing executed in content receiving system 4 in the fourth exemplary embodiment.

FIG. 18 is a chart showing a series of processing when, in content receiving system 4, a list of the broadcast stations receivable by content receiving device 10B is presented to the user on display device 40, and a content item which is broadcast from a broadcast station designated by the user based on the list is reproduced by display device 40 and is displayed on display 450 (refer to FIG. 6). Note that the same reference numerals are assigned to substantially the same processing as the processing (refer to FIG. 10) of content receiving system 1 described in the first exemplary embodiment, and a detailed description thereof is omitted.

By processing similar to the processing described with reference to FIG. 10, the P2P connection is established between display device 40 and content receiving device 10B (Step S106, Step S107). Note that communication between display device 40 and content receiving device 10B, which is performed in Step S107 and the subsequent steps, is performed through this P2P connection.

List request transmitter 411 (refer to FIG. 6, FIG. 7) of display device 40 transmits an acquisition request for a broadcast station list to content receiving device 10B (Step S301).

The acquisition request for the broadcast station list being transmitted by display device 40 in Step S301 is a request for causing display device 40 to acquire the broadcast station list, which shows a list of the channels receivable by content receiving device 10B (list of the broadcast stations receivable by content receiving device 10B), from content receiving device 10B. Then, content receiving device 10B receives the acquisition request for the broadcast station list being transmitted from display device 40 in Step S301.

List controller 130B (refer to FIG. 16) of content receiving device 10B transmits the broadcast station list to display device 40, in response to the acquisition request for the broadcast station list being received in Step S301 (Step S302).

Display device 40 receives the broadcast station list transmitted from content receiving device 10B in Step S302. Note that the broadcast station list may be lists different from each other for each of the tuner sources, such as a list for the terrestrial digital broadcasting and a list for the BS broadcasting.

List display controller 413 (refer to FIG. 6, FIG. 7) of display device 40 displays the broadcast station list, which is received in Step S302, on display 450 (Step S303). An example of the broadcast station list displayed on display 450 will be described later with reference to FIG. 19.

Thumbnail request transmitter 421 (refer to FIG. 6, FIG. 8) of display device 40 transmits the acquisition request for the thumbnail to content receiving device 10B (Step S108).

Thumbnail request receiver 141 (refer to FIG. 16) provided in thumbnail controller 140B of content receiving device 10B receives the acquisition request for the thumbnail being transmitted from display device 40 in Step S108. The identification information for identifying one broadcast station is included in the acquisition request for the thumbnail.

Content receiver 110B of content receiving device 10B and thumbnail generator 142B (refer to FIG. 16) of thumbnail controller 140B generate the thumbnail of the content item broadcast from the broadcast station receivable by content receiving device 110B (Step S109A). Details of Step 109A will be described later with reference to FIG. 20. Note that Step S109A may be executed any time before Step S109B.

When the acquisition request for the thumbnail is received by thumbnail request receiver 141, thumbnail transmitter 143 (refer to FIG. 16) of thumbnail controller 140B transmits the thumbnail generated in Step S109A, to display device 40 in response to the acquisition request for the thumbnail (Step S109B, Step S110). Details of Step 109B will be described later with reference to FIG. 21.

List display controller 413 (refer to FIG. 6, FIG. 7) of display device 40 displays the thumbnail acquired in Step S110, on display 450 (Step S111).

At this time, list display controller 413 of display device 40 displays the thumbnail acquired in Step S110, on a spot, which corresponds to the broadcast station identified by the identification information, in the broadcast station list displayed in Step S303.

Setting unit 440 (refer to FIG. 6) of display device 40 accepts an input operation (selection operation for the broadcast station) performed by the user based on the broadcast station list currently displayed on display 450 (Step S121A). The input operation performed by the user at this time is substantially the same as an input operation described in Step S121 shown in FIG. 10 of the first exemplary embodiment, and accordingly, a description thereof is omitted.

Content request transmitter 431 (refer to FIG. 6, FIG. 9) of display device 40 transmits the acquisition request for the content item, which is broadcast by the broadcast station selected by the user in Step S121A, to content receiving device 10B (Step S122).

Content request receiver 151 (refer to FIG. 2, FIG. 5) of content receiving device 10B receives the acquisition request for the content item being transmitted from display device 40 in Step S122. Content transmitter 153 (refer to FIG. 2, FIG. 5) of content receiving device 10B transmits the content items, which correspond to the acquisition request for the content item, to display device 40 (Step S123).

Content acquisition unit 432 (refer to FIG. 6, FIG. 9) of display device 40 receives and acquires the content item transmitted from content receiving device 10B in Step S123. Content reproducer 433 (refer to FIG. 6, FIG. 9) of display device 40 reproduces the content item and displays the content item on display 450 (Step S124A).

Note that, after displaying the thumbnail on display 450 in Step S111, display device 40 may periodically update the displayed thumbnail. That is, with regard to the channel for which the thumbnail is displayed in Step S111, display device 40 re-executes Step S108 to re-transmit the acquisition request for the thumbnail of the channel, and re-displays the thumbnail re-acquired thereby by re-executing Step S111, and may thereby update the thumbnail. In accordance with this operation example, in display device 40, the thumbnail is periodically updated, and accordingly, for example, a thumbnail simulatively displayed as a moving image can be presented to the user.

By the above-described series of processing, in content receiving system 4, display device 40 can acquire the list of the broadcast stations, which are receivable by content receiving device 10B, from content receiving device 10B, can display the acquired list on display 450 together with the thumbnail, and can present the acquired list to the user. Then, from content receiving device 10B, display device 40 can acquire the content item, which is broadcast from the station designated by the user among the broadcast stations included in the list, can reproduce the acquired content item, and can display the acquired content item on display 450.

That is, the user can view, on display 450 of display device 40, the content item, which is broadcast from the broadcast station designated by the user based on the list of the broadcast stations and the thumbnail, which are displayed on display 450 of display device 40, from among the plurality of broadcast stations receivable by content receiving device 10B.

Next, a description is made of the list of the broadcast stations being displayed on display 450 of display device 40.

Figure 19:
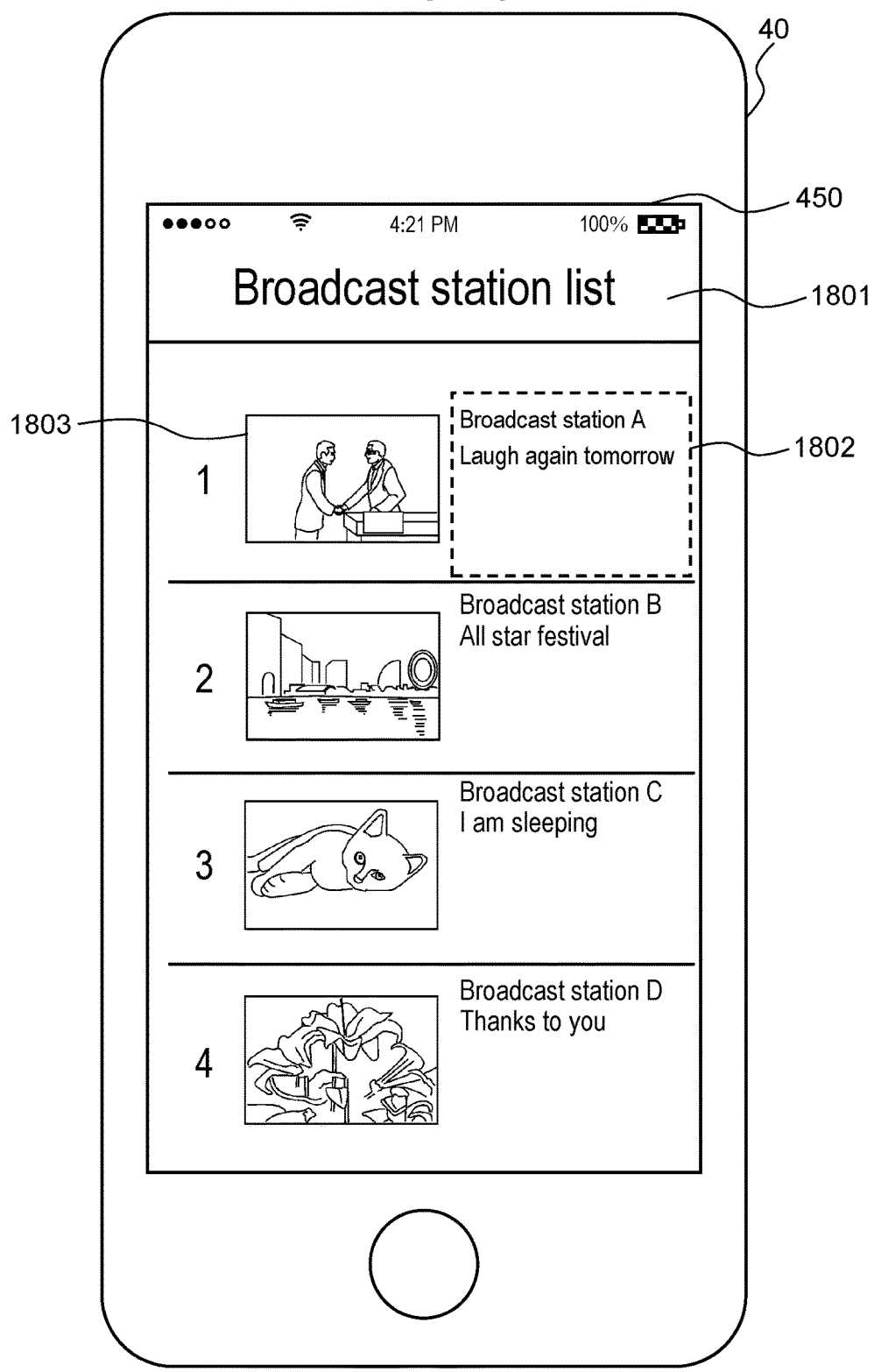
FIG. 19 is a diagram showing an example of an image displayed on a display device in the fourth exemplary embodiment.

FIG. 19 is a diagram showing an example of image 1801 displayed on display device 40 in the fourth exemplary embodiment. Image 1801 is the list of the broadcast stations, which includes the thumbnails.

As shown in FIG. 19, for the respective broadcast stations, image 1801 includes: portions 1802 showing titles and the like of the content items which are broadcast by the broadcast stations; and portions 1803 showing the thumbnails of the content items.

On each of portions 1802, information such as a name of the broadcast station and a title of the content item is displayed by characters (text).

On each of portions 1803, the thumbnail of the content item is displayed. Moreover, portions 1803 are displayed next to portions 1802. This is to visually indicate that portions 1803 are the thumbnails of the content items shown by portions 1802. Note that portions 1803 do not always have to be displayed next to portions 1802. However, it is desired that portions 1802 and portions 1803 be displayed in a display mode which is easy for the user to recognize that portions 1802 and portions 1803 are associated with each other (for example, portions 1802 and portions 1803 are connected to each other by lines, a color of the characters or background of each of portions 1802 and a color of a frame of each of portions 1803 are set to the same or similar color, and so on).

As described above, in the fourth exemplary embodiment, for each of the broadcast stations, the thumbnail of the content item which is broadcast from the broadcast station is displayed on display 450 of display device 40 in addition to the display of the name of the broadcast station and the like by the characters. Hence, on display device 40, the user who is to select one of the broadcast stations receivable by content receiving device 10, and to view the content item which is broadcast from the selected broadcast station, can visually and more easily confirm the content item, which is broadcast from each broadcast station serving as a selection target.

Next, Step S109A and Step S109B are described.

Figure 20:
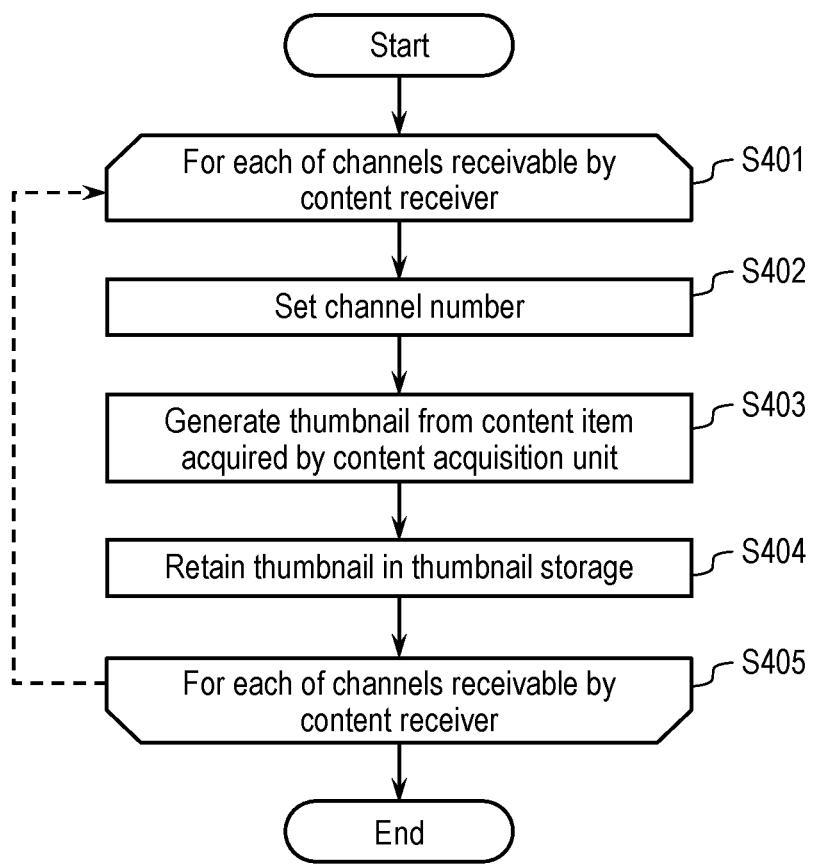
FIG. 20 is a flowchart showing an example of thumbnail generation processing executed in the content receiving device in the fourth exemplary embodiment.

FIG. 20 is a flowchart showing an example of thumbnail generation processing executed in content receiving device 10B in the fourth exemplary embodiment. The flowchart of FIG. 20 illustrates details of Step S109A shown in FIG. 18.

For each of the channels receivable by content receiver 110B (refer to FIG. 16), content receiving device 10B sequentially executes processing of Step S402 to Step S404 (Step S401 and Step S405). Hereinafter, a channel taken as a processing target among "the channels receivable by content receiver 110B" is referred to as a "target channel".

Channel setting unit 114B (refer to FIG. 16) sets a channel number of the target channel to tuner 112 (Step S402).

After a predetermined time (for example, 1 to 3 seconds) has elapsed since the channel number is set to tuner 112, channel setting unit 114B notifies thumbnail generator 142B that the channel number is set to tuner 112. Such a notification becomes a notification that substantially urges thumbnail generator 142B to generate the thumbnail from channel setting unit 114B.

Thumbnail generator 142B (refer to FIG. 16) that receives this notification from channel setting unit 114B generates the thumbnail from the content item acquired by content acquisition unit 113 (Step S403).

Then, thumbnail generator 142B retains the thumbnail generated in Step S403, in thumbnail storage 146 (Step S404).

Figure 21:
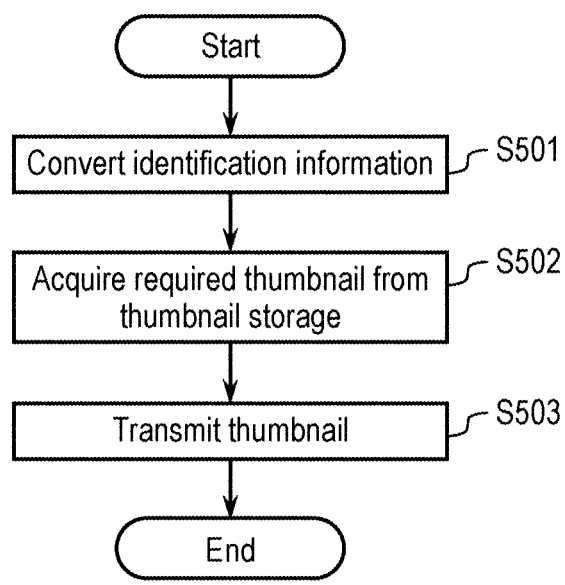
FIG. 21 is a flowchart showing an example of thumbnail transmission processing executed in the content receiving device in the fourth exemplary embodiment.

FIG. 21 is a flowchart showing an example of thumbnail transmission processing executed in content receiving device 10B in the fourth exemplary embodiment. The flowchart of FIG. 21 illustrates details of Step S109B shown in FIG. 18.

Information converter 144 (refer to FIG. 16) converts the identification information included in the acquisition request for the thumbnail, the acquisition request being transmitted from display device 40 and received in Step S108 (refer to FIG. 18), into the channel number (Step S501). Note that, if the identification information is the channel number, information converter 144 can use the channel number as it is.

Reader 145 (refer to FIG. 16) of thumbnail request receiver 141 reads out and acquires the thumbnail from thumbnail storage 146 (Step S502). This thumbnail is a thumbnail of a content item which is broadcast in the channel identified by the identification information included in the acquisition request for the thumbnail being transmitted from display device 40 and received in Step S108.

Thumbnail transmitter 143 transmits, to display device 40, the thumbnail acquired by reader 145 of thumbnail request receiver 141 in Step S502, in response to the acquisition request for the thumbnail being transmitted from display device 40 (Step S503).

[4-3. Effects]

As described above, the content receiving device in this exemplary embodiment transmits, to the display device, the thumbnail of the content items which are broadcast from the broadcast station receivable by the content receiving device. The thumbnails are displayed on the display of the display device, and are presented to the user, whereby the user who uses the display device can know the content items broadcast from the broadcast stations receivable by the content receiving device (that is, the content items of the broadcast stations that can be viewed on the display device). As described above, the content receiving device can present the list of the content items, which are acquired from the receivable broadcast stations, to the user who uses the display device, and accordingly, the convenience for the user can be enhanced.

Moreover, in a case where the channel for which the thumbnail should be presented is designated from the display device, the content receiving device acquires the thumbnail of the content item which is broadcast in the designated channel from among the thumbnails generated in advance and stored in the thumbnail storage, and transmits the acquired thumbnail to the display device. In this way, the content receiving device can present, to the user, the thumbnail that is based on the designated channel.

Moreover, the content receiving device executes, in advance, processing for receiving content items of a predetermined channel, and generating thumbnails of the content items and storing the generated thumbnails in the thumbnail storage. Then, the content receiving device transmits, to the display device, a thumbnail corresponding to the acquisition request for the thumbnail from among the thumbnails generated in advance (that is, a thumbnail corresponding to the broadcast station identified by the identification information included in the acquisition request for the thumbnail).

In this way, in the content receiving device, in the case where the thumbnail, which corresponds to the broadcast station identified by the identification information included in the acquisition request for the thumbnail being received from the display device, is retained in the thumbnail storage, the thumbnail can be read out from the thumbnail storage, and can be transmitted to the display device. Therefore, the thumbnail generator does not have to generate the thumbnail in such a case.

As described above, for the acquisition request for the thumbnail being transmitted from the display device, the content receiving device can use the already generated thumbnail, and accordingly, can reduce the processing required for the generation of the thumbnail in the content receiving device. Moreover, in such a case, the time required for the generation of the thumbnail is shortened, and accordingly, the time required since the acquisition request for the thumbnail is received until the thumbnail is transmitted can be reduced. In this way, the convenience for the user can be further enhanced.

Moreover, in a case where a plurality of the channels for which the thumbnails should be presented are designated, the content receiving device may transmit, to the display device, the thumbnails of the content items which are broadcast individually in the plurality of designated channels. In this way, the content receiving device can present, to the user, the thumbnails individually corresponding to the plurality of designated channels.

Moreover, the content receiving device may generate one moving image file including the plurality of thumbnails, and may transmit the generated moving image file to the display device. In this way, traffic of data transmitted and received between the content receiving device and the display device can be reduced, and in each of the devices, processing at the time of transmitting and receiving the data can be reduced.

Moreover, the content receiving device may convert the identification information included in the acquisition request for the thumbnail into an appropriate format, may acquire the thumbnail of the content item, which is broadcast in the channel corresponding to the identification information, from among the thumbnails generated in advance and stored in the thumbnail storage, and may transmit the generated thumbnail to the display device. In this way, the content receiving device can present, to the user, the thumbnail that is based on the designated channel. In this way, even if pieces of identification information with a variety of formats are received, the content receiving device can transmit the thumbnail to the display device appropriately.

Moreover, the display device may update the displayed thumbnails. In this way, the display device can present a newer thumbnail to the user. That is, the display device can enhance the convenience for the user in the case of presenting, to the user, the list of the content items acquired from the broadcast waves by the content receiving device.

CONCLUSION

As described above, the content receiving device in the exemplary embodiment of the present disclosure includes: a content receiver that acquires a content item; a generator that generates a thumbnail of the content item acquired by the content receiver; a thumbnail storage that stores the thumbnail generated by the generator; a request receiver that receives an acquisition request for the thumbnail; and a transmitter. The transmitter transmits the thumbnail stored in the thumbnail storage, to a transmission source of the acquisition request for the thumbnail, in response to the acquisition request for the thumbnail being received by the request receiver.

For example, the content receiving device configured as described above can transmit the thumbnail of the content item, which is acquired from the receivable broadcast station, to the display device. The display device that receives the thumbnail can display the thumbnail on the display and can present the thumbnail to the user, and accordingly, the user can easily know, by the thumbnail, the content item which is broadcast from the broadcast station receivable by the content receiving device. That is, this content receiving device can enhance the convenience for the user in the case of presenting, to the user, the list of the content items acquired from the broadcast waves or the like.

Moreover, in this content receiving device, in the case where the thumbnail, which corresponds to the acquisition request for the thumbnail being received from the display device, is retained in the thumbnail storage, the thumbnail can be read out from the thumbnail storage, and can be transmitted to the display device. Therefore, the thumbnail generator does not have to generate the thumbnail in such a case.

As described above, for the acquisition request for the thumbnail being transmitted from the display device, this content receiving device can use the already generated thumbnail, and accordingly, the processing required for the generation of the thumbnail in the content receiving device can be reduced. Moreover, in such a case, the time required for the generation of the thumbnail is shortened, and accordingly, the time required since the acquisition request for the thumbnail is received until the thumbnail is transmitted can be reduced. In this way, the convenience for the user can be further enhanced.

Moreover, in this content receiving device, the content receiver may individually receive broadcast waves broadcast from a plurality of broadcast stations, and may acquire the content items. The request receiver may receive the acquisition request for the thumbnail, the acquisition request including identification information for identifying one or more of the plurality of broadcast stations. The transmitter may transmit the thumbnails of the content items, which are acquired from the broadcast stations identified by the identification information, to the transmission source of the acquisition request for the thumbnail.

In this configuration, at the time of receiving the acquisition request for the thumbnail including the identification information for identifying the broadcast station, the content receiving device can select the thumbnail of the content item, which is acquired from the broadcast station identified by the identification information, from among the plurality of thumbnails generated in advance and stored in the thumbnail storage, can transmit the selected thumbnail to the display device, and can present the transmitted thumbnail to the user. That is, this content receiving device can transmit the thumbnail of the content item which is broadcast from the broadcast station requested from the display device, to the display device, and can present the transmitted thumbnail to the user who uses the display device.

Moreover, in this content receiving device, the content receiver may sequentially receive the broadcast waves transmitted from the plurality of broadcast stations and may acquire the content items based on the list indicating the broadcast stations receivable by the content receiver.

In this configuration, the content receiving device can set the channels of the predetermined broadcast stations to the tuner, can receive the content items which are broadcast in the channel, and can generate the thumbnails of the received content items in advance. Then, from among the generated thumbnails, the content receiving device can transmit the thumbnail of the content item, which is broadcast in the channel corresponding to the identification information included in the acquisition request for the thumbnail, to the display device. Hence, this content receiving device can shorten the time from the reception of the acquisition request for the thumbnail until the transmission of the thumbnail to the display device, the transmitted thumbnail being based on the identification information included in the acquisition request for the thumbnail.

Moreover, in this content receiving device, at the time of transmitting a plurality of the thumbnail, the transmitter may generate one moving image file having each of the plurality of thumbnails as an image frame, and may transmit the generated moving image file to the transmission source of the acquisition request for the thumbnail.

In this configuration, the content receiving device can reduce the traffic of the data at the time of transmitting the plurality of thumbnails to the display device, and can reduce the processing executed at the data transmission/reception time in the content receiving device and the display device.

Moreover, this content receiving device may include an information converter that converts the identification information into a channel number corresponding to a broadcast wave of a broadcast station identified by the identification information.

In the content receiving device configured as described above, the identification information included in the acquisition request for the thumbnail can be converted into an appropriate format capable of being handled in the content receiver. Hence, this content receiving device can correspond to the identification information with a variety of formats.

Moreover, the content receiving system in the exemplary embodiment of the present disclosure includes: a content receiving device; and a display device. The content receiving device includes: a content receiver that acquires a content item; a generator that generates a thumbnail of the content item, which is acquired by the content receiver; a thumbnail storage that stores the thumbnail generated by the generator; a request receiver that receives an acquisition request for a thumbnail being transmitted from the display device; and a transmitter that transmits the thumbnail stored in the thumbnail storage, to the display device which is a transmission source of the acquisition request for the thumbnail, in response to the acquisition request for the thumbnail being received by the request receiver. The display device includes: a thumbnail request transmitter that transmits the acquisition request for the thumbnail to the content receiving device; a thumbnail receiver that receives the thumbnail transmitted from the content receiving device; and a display that displays the thumbnail received by the thumbnail receiver.

In this content receiving system, similar effects to those of the above-described content receiving device can be obtained.

In this content receiving system, the display device may periodically transmit the acquisition request for the thumbnail, and may periodically update the thumbnail currently displayed on the display. For this purpose, the acquisition request for the thumbnail may include the identification information for identifying the broadcast station that broadcasts the content item corresponding to the thumbnail currently displayed on the display.

In this configuration, the display device updates the displayed thumbnail, and can thereby present a newer thumbnail to the user. Hence, this display device can enhance the convenience in the case of presenting, to the user, the list of the content items acquired from the broadcast waves.

Moreover, a control method of a content receiving device in the exemplary embodiment of the present disclosure includes: a content acquisition step of acquiring a content item; a generation step of generating a thumbnail of the content item, which is acquired in the content acquisition step; a thumbnail storage step of storing the thumbnail generated in the generation step; a request receiving step of receiving an acquisition request for the thumbnail; and a transmission step of transmitting the thumbnail stored in the thumbnail storage step, to a transmission source of the acquisition request for the thumbnail, in response to the acquisition request for the thumbnail being received in the request receiving step.

A content receiving device that operates by this control method can obtain similar effects to those of the above-described content receiving device.

Moreover, a program in the exemplary embodiment of the present disclosure is a program for causing a computer to execute the above-described control method.

Note that, in the above-described device and system, content receiver 110B is an example of the content receiver. Thumbnail generator 142B is an example of the generator. Thumbnail storage 146 is an example of the thumbnail storage. Thumbnail request receiver 141 is an example of the request receiver. Thumbnail transmitter 143 is an example of the transmitter. Information converter 144 is an example of the information converter. Content receiving device 10B is an example of the content receiving device. Each of display devices 40, 41, 40A is an example of the display device. Thumbnail request transmitter 421 is an example of the thumbnail request transmitter. Thumbnail receiver 422 is an example of the thumbnail receiver. Each of displays 450, 402A is an example of the display. Content receiving system 4 is an example of the content receiving system. Image 1801 is an example of the image displayed on the display.

Note that, in the following device and system, each of content receiving systems 1, 2, 3, 4 is an example of the content receiving system. Each of content receiving devices 10, 11, 15, 10A, 10B is an example of the content receiving device. Each of servers 30, 30A is an example of the server. Each of display devices 40, 41, 40A is an example of the display device. Each of content receivers 110, 110B and first receiver 101A is an example of the first receiver. Each of list transmitters 133, 103A is an example of the list transmitter. Each of thumbnail generators 142, 102A, 142B is an example of the thumbnail generator. Each of thumbnail transmitters 143, 104A is an example of the thumbnail transmitter. Each of list acquisition unit 412 and second receiver 401A is an example of the second receiver. Each of displays 450, 402A is an example of the display. Each of images 1101, 1801 is an example of the image displayed on the display.

The content receiving system in the exemplary embodiment of the present disclosure includes: the content receiving device; the server; and the display device. The content receiving device includes: the first receiver that receives a content item; the list transmitter; the thumbnail generator; and the thumbnail transmitter. The list transmitter transmits the list, which includes the information indicating the content item received by the first receiver, to the display device through the server. The thumbnail generator generates a thumbnail of the content item received by the first receiver. The thumbnail transmitter transmits the thumbnail generated by the thumbnail generator, to the display device. The display device includes: the second receiver; and the display. The second receiver receives the list transmitted by the list transmitter, and the thumbnail transmitted by the thumbnail transmitter. The display displays an image in which a thumbnail of a content item among a plurality of the thumbnails received by the second receiver is associated with the information included in the list received by the second receiver, the thumbnail of the content item corresponding to the information.

In this content receiving system, after generating the thumbnail of the acquired content item, the content receiving device directly transmits the generated thumbnail to the display device without passing through the server.

In a case where it is assumed that the server holds such thumbnails, and the thumbnails are supplied from the server to the display device, the server must include a storage device provided with a storage capacity necessary for retaining the thumbnails. Moreover, a communication line is required, which is provided with a channel capacity that enables the thumbnails to be transmitted from the content receiving device to the server, and enables the thumbnails to be transmitted from the server to the display device. Then, as the number of such content receiving devices connected to the server is increased, the storage capacity of the storage device, which is necessary for retaining the thumbnails, is increased, and moreover, the channel capacity of the communication line, which is necessary for transmitting and receiving the thumbnails, is increased.

In this content receiving system, the server does not have to retain the thumbnails in the series of processing in which the display device acquires the thumbnails from the content receiving device. Hence, the server does not have to include a storage device with a large storage capacity for retaining the thumbnails. Moreover, for the communication line that connects the server thereto, a communication line with a large channel capacity necessary for transmitting and receiving the thumbnails does not have to be used. Hence, in this content receiving system, the increase in the storage capacity of the storage device provided in the server can be suppressed, and moreover, the increase in the channel capacity of the communication line that connects the server thereto can be suppressed.

In this content receiving system, the thumbnail generator generates the thumbnail based on the request from the display device, and the thumbnail transmitter transmits the thumbnail to the display device based on this request.

In this configuration, the content receiving device operates so as to generate the thumbnail and transmit the thumbnail to the display device in the case of receiving the request from the display device. Hence, in a case of not receiving the request from the display device, the content receiving device does not generate the thumbnail, and accordingly, the amount of the processing that should be executed in the content receiving device can be reduced.

Moreover, in this content receiving system, the content receiving device includes the content transmitter that, at the time of receiving the information for identifying a content item selected by the user among the content items included in the list from the display device, encodes the selected content item into a format displayable by the display, and transmits the already encoded content item to the display device.

Note that content transmitter 153 is an example of the content transmitter.

In this configuration, the content receiving device operates so as to transmit the content item, which is selected by the user based on the thumbnail displayed on the display device, to the display device. In this case, the content item is encoded appropriately based on the request from the display device, and accordingly, the display device can display the content item appropriately.

Moreover, this content receiving system includes a plurality of the content receiving devices, the display device includes an acquisition request transmitter that transmits the acquisition requests for the thumbnail individually to the plurality of content receiving devices, and the second receiver sequentially receives the thumbnails, which are transmitted by the thumbnail transmitters of the content receiving devices, for each of the content receiving devices.

Note that thumbnail request transmitter 421 is an example of the acquisition request transmitter.

In this configuration, the display device can display the list including the content items held by the plurality of content receiving devices. Then, if the user browses the list displayed on the display device and selects the content item, the content item is transmitted to the display device from the content receiving device that holds the content item selected by the user, and the content item is reproduced on the display device. In this way, the user can view the content item, which is selected on the display device, on the display device.

Moreover, in this content receiving system, the thumbnail generator extracts a part of a plurality of image frames included in the content item, and generates a thumbnail with a moving image file format by using the extracted image frame.

In this configuration, the content receiving device can generate a thumbnail with the moving image file format, and can transmit the generated thumbnail to the display device. In this way, by this thumbnail, the user can more easily know the details of the content item indicated by the thumbnail compared to a thumbnail of a still image.

Moreover, in this content receiving system, the content receiving device includes a tuner for receiving a broadcast wave, and the first receiver receives the broadcast wave by the tuner, and receives a broadcast content item included in the received broadcast wave, as a content item.

Note that each of a tuner (not shown) provided in content receiver 110 and tuner 112 provided in content receiver 110B is an example of the tuner.

In this configuration, the content receiving device can acquire the content item from the broadcast wave broadcast from the broadcast station, and can generate the thumbnail. By the generated thumbnail, the user can know what content item is acquired from the broadcast wave by the content receiving device. Then, the user can view the content item on the display device.

Moreover, in this content receiving system, the content receiving device includes a storage, and the first receiver retains a broadcast content item, which is included in the received broadcast wave, in the storage, and acquires a broadcast content item retained in the storage, as a content item.

Note that storage 120 is an example of the storage.

In this configuration, the content receiving device can read out and acquire the content item, which is acquired from the broadcast wave and retained in the storage, from the storage, and can generate the thumbnail of the content item. By the generated thumbnail, the user can know what content item is retained in the storage of the content receiving device. Then, the user can view the content item on the display device.

Moreover, in this content receiving system, the display device and the content receiving device make a P2P (Peer to Peer)-type communication connection, and the thumbnail transmitter transmits the thumbnail to the display device by using the P2P-type communication connection.

In this configuration, the display device can acquire the thumbnail from the content receiving device by the P2P communication. That is, the display device can acquire the thumbnail from the content receiving device without relaying other communication device.

Moreover, the content receiving device in the exemplary embodiment of the present disclosure includes: a first receiver that receives a content item; a list transmitter; a thumbnail generator; and a thumbnail transmitter. The list transmitter transmits a list, which includes the information indicating the content item received by the first receiver, to the display device through the server. The thumbnail generator generates a thumbnail of the content item received by the first receiver. The thumbnail transmitter transmits the thumbnail generated by the thumbnail generator, to the display device.

In a content receiving system including this content receiving device, similar effects to those of the above-described content receiving system can be obtained.

Moreover, the display device in the exemplary embodiment of the present disclosure includes: a second receiver; and a display. The second receiver receives the list and the thumbnails, which are transmitted from the content receiving device. The display displays an image in which a thumbnail of a content item among the thumbnails received by the second receiver is associated with the information included in the list received by the second receiver, the thumbnail of the content item corresponding to the information.

In a content receiving system including this display device, similar effects to those of the above-described content receiving system can be obtained.

Moreover, a control method of the content receiving system in the exemplary embodiment of the present disclosure is a control method of a content receiving system including a content receiving device, a server and a display device. This control method includes: a first reception step of causing the content receiving device to receive a content item; a list transmission step of causing the content receiving device to transmit a list, which includes information indicating the content item received in the first reception step, through the server to the display device; a thumbnail generation step of causing the content receiving device to generate a thumbnail of the content item received in the first reception step; a thumbnail transmission step of causing the content receiving device to transmit the thumbnail generated in the thumbnail generation step, to the display device; a second reception step of causing the display device to receive the list transmitted in the list transmission step and the thumbnail transmitted in the thumbnail transmission step; and a display step of causing the display device to display, on a display, an image in which a thumbnail of a content item among a plurality of the thumbnails received in the second reception step is associated with the information included in the list received in the second reception step, the thumbnail of the content item corresponding to the information.

A content receiving system that operates by this control method can obtain similar effects to those of the above-described content receiving system.

Moreover, a program in the exemplary embodiment of the present disclosure is a program for causing a computer to execute the above-described control method.

As described above, the description is made of the first to fourth exemplary embodiments as illustration of the technique disclosed in the present application. For this purpose, the accompanying drawings and the detailed description are provided. However, the technique in the present disclosure is not limited thereto, and is also applicable to exemplary embodiments subjected to alteration, replacement, addition, omission and the like. Moreover, it is also possible to form new exemplary embodiments by combining the respective constituent elements described in the first to fourth exemplary embodiments.

The constituent elements described in the accompanying drawings and the detailed description can include not only constituent elements, which are essential for solving the problem, but also constituent elements, which are provided for exemplifying the above-described technique, and are not essential for solving the problem. Therefore, it should not be immediately recognized that such non-essential constituent elements are essential based on the fact that the non-essential constituent elements are described in the accompanying drawings and the detailed description.

Moreover, the above-mentioned exemplary embodiments are those for exemplifying the technique in this disclosure, and accordingly, can be subjected to varieties of alterations, replacements, additions, omissions and the like within the scope of claims or within the scope of equivalents thereof.

INDUSTRIAL APPLICABILITY

The present disclosure is applicable to a content receiving system that presents a thumbnail of a content item to a display device. Specifically, the present disclosure is applicable to a recording device that stores the content item in a variety of recording mediums, a television set, a smart phone, a cellular phone, a tablet terminal, a personal computer, a server computer, and the like.

REFERENCE MARKS IN THE DRAWINGS

1, 2, 3, 4: content receiving system
10, 10A, 10B, 11, 15: content receiving device
20, 25: communication device
30, 30A: server
40, 40A, 41: display device
50: network
101A: first receiver
102A, 142, 142B: thumbnail generator
103A, 133: list transmitter
104A, 143: thumbnail transmitter
110, 110B: content receiver
111: antenna 112: tuner
113: content acquisition unit
114B: channel setting unit
120: storage
130, 130B, 410: list controller
131: list request receiver
132: list generator
140, 140B, 420: thumbnail controller
141: thumbnail request receiver
142A, 146, 425: thumbnail storage
144: information converter
145: reader
150, 430: content controller
151: content request receiver
152: content converter
153: content transmitter
160, 460: communication IF
301A: relay
401A: second receiver
402A, 450: display
411: list request transmitter
412: list acquisition unit
413: list display controller
421: thumbnail request transmitter
422: thumbnail receiver
423: thumbnail display instruction unit
431: content request transmitter
432: content acquisition unit
433: content reproducer
440: setting unit
1101, 1801: image
1102, 1103, 1802, 1803: portion

The invention claimed is:

1. A display device comprising:
a display;
a list controller;
a thumbnail controller;
a content controller; and
a communication unit, wherein:
the list controller includes:
  a list request transmitter for transmitting, to a server, a first acquisition request signal for requesting a list of content items;
  a list acquisition unit for acquiring the list of the content items transmitted in response to the first acquisition request signal from the server; and
  a list display controller for controlling the display so that the list of the content items acquired by the list acquisition unit is displayed on the display,
the communication unit establishes a connection between the display device and a content reception device, the connection being made based on a communication mode for performing communication between the display device and the content reception device without passing via the server, while the list of the content items is displayed on the display,
the thumbnail controller includes;
  a thumbnail request transmitter for transmitting, to the content reception device, a second acquisition request signal for requesting a thumbnail corresponding to a content ID of a content item included in the list of the content items displayed on the display, after the communication unit establishes the connection based on the communication mode, while the list of the content items is displayed on the display, the second acquisition request signal being transmitted based on the communication mode via the established connection;
  a thumbnail receiver for receiving the thumbnail transmitted in response to the second acquisition request signal from the content reception device; and
  a thumbnail display instruction unit for instructing the list display controller such that the thumbnail received by the thumbnail receiver is displayed so that the received thumbnail is associated with the content item included in the list of the content items displayed on the display, and
the content controller includes;
  a content request transmitter for transmitting, to outside the display device, a third acquisition request signal for requesting the content item included in the list of the content terns displayed on the display;
  a content acquisition unit for acquiring the content item transmitted in response to the third acquisition request signal; and
  a content reproducer for reproducing the content item to display the content item on the display.

2. The display device according to claim 1,
wherein the thumbnail request transmitter periodically transmits the second acquisition request signal, with regard to the thumbnail currently displayed on the display, and
wherein the thumbnail display instruction unit periodically updates the thumbnail received by the thumbnail receiver and displays the thumbnail on the display.

3. The display device according to claim 1, further comprising a thumbnail storage for storing the thumbnail received by the thumbnail receiver,
wherein the thumbnail request transmitter transmits the second acquisition request signal, in a case where the thumbnail as a target of the second acquisition request signal is not stored in the thumbnail storage.

4. A method of operating a display device, the display device comprising a display, the method comprising:
transmitting, to a server, a first acquisition request signal for requesting a list of content items;
acquiring the list of the content items transmitted in response to the first acquisition request signal from the server;
controlling the display so that the list of the content items acquired in the acquiring the list is displayed on the display;
establishing a connection between the display device and a content reception device, the connection being made based on a communication mode for performing communication between the display device and the content reception device without passing via the server, while the list of the content items is displayed on the display,
transmitting, to the content reception device, a second acquisition request signal for requesting a thumbnail corresponding to a content ID of a content item included in the list of the content items displayed on the display, after the connection based on the communication mode is established, while the list of the content items is displayed on the display, the second acquisition request signal being transmitted based on the communication mode via the established connection;
receiving the thumbnail transmitted in response to the second acquisition request signal from the content reception device;
displaying the thumbnail received by the thumbnail receiver so that the received thumbnail is associated with the content item included in the list of the content items displayed on the display;

transmitting, to outside the display device, a third acquisition request signal for requesting the content item included in the list of the content items displayed on the display, acquiring the content item transmitted in response to the third acquisition request signal; and reproducing the content item to display the content item on the display.

5. The method according to claim 4, wherein the second acquisition request signal is periodically transmitted, with regard to the thumbnail currently displayed on the display, and wherein the thumbnail received by the thumbnail receiver is periodically updated and the thumbnail is displayed on the display.

6. The method according to claim 4, further comprising storing the thumbnail received in a thumbnail storage, wherein the second acquisition request signal is transmitted, in a case where the thumbnail as a target of the second acquisition request signal is not stored in the thumbnail storage.

* * * * *